US009525547B2

(12) United States Patent
Barrus et al.

(10) Patent No.: US 9,525,547 B2
(45) Date of Patent: Dec. 20, 2016

(54) TRANSMISSION OF MEDIA KEYS

(75) Inventors: John W. Barrus, Menlo Park, CA (US); Jamey Graham, San Jose, CA (US); Kurt Piersol, Campbell, CA (US)

(73) Assignee: Ricoh Company, Ltd., Tokyo (JP)

(*) Notice: Subject to any disclaimer, the term of this patent is extended or adjusted under 35 U.S.C. 154(b) by 714 days.

(21) Appl. No.: 11/396,381

(22) Filed: Mar. 31, 2006

(65) Prior Publication Data
US 2007/0230703 A1 Oct. 4, 2007

(51) Int. Cl.
*H04L 9/08* (2006.01)
(52) U.S. Cl.
CPC ........... *H04L 9/0819* (2013.01); *H04L 9/0838* (2013.01); *H04L 2209/60* (2013.01); *H04L 2209/80* (2013.01)
(58) Field of Classification Search
CPC .... H04L 9/08; H04L 63/0428; H04L 2209/60; H04L 2209/80; G06F 21/10
USPC ......................... 380/277; 455/556.1; 713/176
See application file for complete search history.

(56) References Cited

U.S. PATENT DOCUMENTS

| 4,974,878 | A | 12/1990 | Josephson |
|---|---|---|---|
| 5,323,465 | A | 6/1994 | Avarne |
| 5,486,686 | A | 1/1996 | Zdybel et al. |
| 5,490,217 | A | 2/1996 | Wang et al. |
| 5,590,197 | A | 12/1996 | Chen et al. |
| 5,635,012 | A | 6/1997 | Belluci et al. |
| 5,694,470 | A | 12/1997 | Jernbacker |
| 5,761,677 | A | 6/1998 | Senator et al. |
| 5,796,839 | A * | 8/1998 | Ishiguro ........................ 380/44 |
| 5,815,657 | A | 9/1998 | Williams et al. |
| 5,933,829 | A | 8/1999 | Durst et al. |
| 5,940,507 | A | 8/1999 | Cane et al. |
| 6,023,682 | A | 2/2000 | Checchio |
| 6,035,290 | A | 3/2000 | Pintsov |
| 6,108,656 | A | 8/2000 | Durst et al. |
| 6,122,394 | A | 9/2000 | Neukermans et al. |
| 6,163,771 | A | 12/2000 | Walker et al. |
| 6,189,009 | B1 | 2/2001 | Stratigos et al. |
| 6,193,155 | B1 | 2/2001 | Walker et al. |
| 6,233,340 | B1 | 5/2001 | Sandru |
| 6,259,367 | B1 | 7/2001 | Klein |
| 6,330,544 | B1 | 12/2001 | Walker et al. |

(Continued)

FOREIGN PATENT DOCUMENTS

| EP | 869 652 A2 | 10/1998 |
|---|---|---|
| EP | 1 028 313 A2 | 8/2000 |

(Continued)

OTHER PUBLICATIONS

Hull et al., "Visualizing Multimedia Content on Paper Documents: Components of Key Frame Selection for Video Paper," *Proc. 7th Int. Conf. on Document Analysis and Recognition*, 4 pages (2003).

(Continued)

*Primary Examiner* — Ellen Tran
(74) *Attorney, Agent, or Firm* — Kilpatrick Townsend & Stockton LLP

(57) ABSTRACT

Techniques are described for communicating electronic media keys from one device to another. The target device may comprise different mechanisms for indicating that transmission of a media key is in progress and also to indicate successful transmission. Various actions may be performed in response to transmission of media keys.

20 Claims, 19 Drawing Sheets

(56) References Cited

U.S. PATENT DOCUMENTS

| | | | |
|---|---|---|---|
| 6,370,514 B1 | 4/2002 | Messner | |
| 6,389,151 B1 | 5/2002 | Carr et al. | |
| 6,390,362 B1 | 5/2002 | Martin | |
| 6,422,462 B1 | 7/2002 | Cohen | |
| 6,526,253 B2 | 2/2003 | Hayashi et al. | |
| 6,574,609 B1* | 6/2003 | Downs et al. | 705/50 |
| 6,618,078 B1 | 9/2003 | Budrys | |
| 6,628,377 B1 | 9/2003 | Sabatini et al. | |
| 6,744,910 B1 | 6/2004 | McClurg et al. | |
| 6,748,424 B1 | 6/2004 | Usuda | |
| 6,755,341 B1 | 6/2004 | Wong et al. | |
| 6,760,843 B1 | 7/2004 | Carter | |
| 6,820,803 B1 | 11/2004 | Browning et al. | |
| 6,831,682 B1 | 12/2004 | Silverbrook et al. | |
| 6,873,430 B2 | 3/2005 | Grasso et al. | |
| 6,917,691 B2 | 7/2005 | Evans et al. | |
| 6,930,803 B1 | 8/2005 | Suzuki | |
| 6,937,989 B2 | 8/2005 | McIntyre et al. | |
| 6,970,573 B2 | 11/2005 | Carr et al. | |
| 6,980,031 B2 | 12/2005 | Fowler | |
| 7,016,524 B2 | 3/2006 | Moore | |
| 7,028,188 B1 | 4/2006 | Moore | |
| 7,080,041 B2 | 7/2006 | Nagel | |
| 7,103,575 B1 | 9/2006 | Linehan | |
| 7,113,925 B2 | 9/2006 | Waserstein et al. | |
| 7,185,205 B2 | 2/2007 | Launchbury et al. | |
| 7,234,801 B2 | 6/2007 | Silverbrook | |
| 7,273,162 B2 | 9/2007 | Baker | |
| 7,308,543 B2 | 12/2007 | Kishi | |
| 7,408,575 B2 | 8/2008 | Kawada | |
| 7,469,824 B1 | 12/2008 | Crews et al. | |
| 7,593,542 B2 | 9/2009 | Abe et al. | |
| 7,599,580 B2 | 10/2009 | King et al. | |
| 7,603,434 B2 | 10/2009 | Svendsen | |
| 7,712,675 B2 | 5/2010 | Balinsky et al. | |
| 7,735,721 B1 | 6/2010 | Ma et al. | |
| 7,797,642 B1 | 9/2010 | Karam et al. | |
| 7,809,156 B2 | 10/2010 | Piersol et al. | |
| 7,865,124 B2 | 1/2011 | Piersol et al. | |
| 7,917,866 B1 | 3/2011 | Karam | |
| 8,554,690 B2 | 10/2013 | Barrus et al. | |
| 8,689,102 B2 | 4/2014 | Graham et al. | |
| 8,756,673 B2 | 6/2014 | Barrus et al. | |
| 8,824,835 B2 | 9/2014 | Piersol et al. | |
| 2001/0014878 A1 | 8/2001 | Mitra et al. | |
| 2001/0037465 A1* | 11/2001 | Hart, III | G06F 17/3089 726/28 |
| 2002/0080387 A1 | 6/2002 | Grasso et al. | |
| 2002/0080959 A1 | 6/2002 | Weller | |
| 2002/0083022 A1 | 6/2002 | Algazi | |
| 2002/0084330 A1 | 7/2002 | Chiu | |
| 2002/0103764 A1 | 8/2002 | Yen et al. | |
| 2002/0116618 A1 | 8/2002 | Muratani | |
| 2002/0143624 A1 | 10/2002 | Catan | |
| 2002/0154930 A1* | 10/2002 | Kawaoka | 400/61 |
| 2002/0174180 A1 | 11/2002 | Brown et al. | |
| 2002/0184494 A1 | 12/2002 | Awadalla | |
| 2003/0001016 A1 | 1/2003 | Frazier et al. | |
| 2003/0028543 A1 | 2/2003 | Dusberger | |
| 2003/0069902 A1 | 4/2003 | Narang et al. | |
| 2003/0079222 A1 | 4/2003 | Boykin et al. | |
| 2003/0130567 A1 | 7/2003 | Mault et al. | |
| 2003/0135420 A1 | 7/2003 | Culling et al. | |
| 2003/0161475 A1 | 8/2003 | Crumly | |
| 2003/0164879 A1 | 9/2003 | Kitagawa | |
| 2003/0223614 A1 | 12/2003 | Robins | |
| 2004/0047000 A1 | 3/2004 | Watanabe et al. | |
| 2004/0065739 A1 | 4/2004 | Xu et al. | |
| 2004/0135867 A1 | 7/2004 | Schmitt et al. | |
| 2004/0143394 A1 | 7/2004 | McIntyre et al. | |
| 2004/0143451 A1 | 7/2004 | McIntyre et al. | |
| 2004/0143552 A1 | 7/2004 | Weichert et al. | |
| 2004/0193571 A1 | 9/2004 | Barrus et al. | |
| 2004/0194026 A1 | 9/2004 | Barrus et al. | |
| 2004/0196490 A1 | 10/2004 | Lapstun et al. | |
| 2004/0200901 A1 | 10/2004 | Lebaschi et al. | |
| 2004/0201676 A1 | 10/2004 | Needham | |
| 2004/0205626 A1 | 10/2004 | Klotz et al. | |
| 2004/0207873 A1 | 10/2004 | Kinjo | |
| 2004/0224670 A1* | 11/2004 | Hull et al. | 455/412.1 |
| 2004/0243478 A1 | 12/2004 | Walker et al. | |
| 2005/0007624 A1 | 1/2005 | Henry | |
| 2005/0010776 A1 | 1/2005 | Kenen et al. | |
| 2005/0013462 A1 | 1/2005 | Rhoads | |
| 2005/0022008 A1 | 1/2005 | Goodman et al. | |
| 2005/0062851 A1 | 3/2005 | Silverbrook et al. | |
| 2005/0085263 A1* | 4/2005 | Kim et al. | 455/556.1 |
| 2005/0097335 A1 | 5/2005 | Shenoy et al. | |
| 2005/0111034 A1 | 5/2005 | Karasaki et al. | |
| 2005/0114232 A1 | 5/2005 | McIntyre et al. | |
| 2005/0132194 A1 | 6/2005 | Ward | |
| 2005/0171847 A1 | 8/2005 | Ling | |
| 2005/0187792 A1 | 8/2005 | Harper | |
| 2005/0197919 A1 | 9/2005 | Robertson | |
| 2005/0200687 A1 | 9/2005 | Silverbrook et al. | |
| 2005/0200703 A1 | 9/2005 | Kobayashi et al. | |
| 2005/0202804 A1 | 9/2005 | Silverbrook et al. | |
| 2005/0223224 A1 | 10/2005 | Carpentier et al. | |
| 2005/0257169 A1 | 11/2005 | Tu | |
| 2005/0258246 A1 | 11/2005 | Wolff et al. | |
| 2005/0286463 A1 | 12/2005 | Matsumoto | |
| 2006/0000900 A1 | 1/2006 | Fernandes et al. | |
| 2006/0012813 A1 | 1/2006 | Lapstun et al. | |
| 2006/0015752 A1 | 1/2006 | Krueger | |
| 2006/0025116 A1 | 2/2006 | Silverbrook et al. | |
| 2006/0047977 A1 | 3/2006 | Hanasaki | |
| 2006/0054702 A1 | 3/2006 | Lei | |
| 2006/0055804 A1 | 3/2006 | Arai et al. | |
| 2006/0056728 A1 | 3/2006 | Silverbrook et al. | |
| 2006/0098900 A1 | 5/2006 | King et al. | |
| 2006/0124722 A1 | 6/2006 | Williams et al. | |
| 2006/0179048 A1* | 8/2006 | Doumuki | 707/4 |
| 2006/0193004 A1 | 8/2006 | Wasilewski et al. | |
| 2006/0218113 A1 | 9/2006 | Kishi | |
| 2006/0224962 A1 | 10/2006 | Ostojic et al. | |
| 2006/0233358 A1 | 10/2006 | Pradhan et al. | |
| 2006/0265590 A1* | 11/2006 | DeYoung et al. | 713/176 |
| 2006/0288236 A1 | 12/2006 | McCue | |
| 2007/0003102 A1 | 1/2007 | Fujii et al. | |
| 2007/0013781 A1 | 1/2007 | Kageyama et al. | |
| 2007/0036470 A1 | 2/2007 | Piersol et al. | |
| 2007/0050696 A1 | 3/2007 | Piersol et al. | |
| 2007/0067248 A1 | 3/2007 | Chatte | |
| 2007/0070218 A1 | 3/2007 | Meijer | |
| 2007/0078685 A1 | 4/2007 | Dettinger et al. | |
| 2007/0204162 A1 | 8/2007 | Rodriguez | |
| 2007/0229678 A1 | 10/2007 | Barrus et al. | |
| 2007/0233612 A1 | 10/2007 | Barrus et al. | |
| 2007/0233613 A1 | 10/2007 | Barrus et al. | |
| 2007/0234215 A1 | 10/2007 | Graham et al. | |
| 2007/0245882 A1 | 10/2007 | Odenwald | |
| 2008/0086421 A1 | 4/2008 | Gilder et al. | |
| 2008/0107271 A1 | 5/2008 | Mergen | |
| 2008/0141117 A1 | 6/2008 | King et al. | |
| 2008/0181398 A1 | 7/2008 | Pappu | |
| 2008/0243702 A1 | 10/2008 | Hart et al. | |
| 2008/0244721 A1 | 10/2008 | Barrus et al. | |
| 2011/0216960 A1 | 9/2011 | VanKirk et al. | |

FOREIGN PATENT DOCUMENTS

| | | |
|---|---|---|
| EP | 1 139 649 A2 | 10/2001 |
| EP | 1 507 262 A1 | 2/2005 |
| EP | 1 583 348 A1 | 10/2005 |
| EP | 1 840 897 A1 | 10/2007 |
| EP | 1840898 A1 | 10/2007 |
| EP | 1883053 A1 | 1/2008 |
| EP | 1975847 A1 | 10/2008 |
| GB | 2417074 A | 2/2006 |
| JP | 58-210779 A | 12/1983 |
| JP | 11-215351 A | 8/1999 |
| JP | 2000-113048 A | 4/2000 |
| JP | 2001-086113 A | 3/2001 |
| JP | 2002-024730 A | 1/2002 |

(56) References Cited

FOREIGN PATENT DOCUMENTS

| | | |
|---|---|---|
| JP | 2002-055609 A | 2/2002 |
| JP | 2002-117359 A | 4/2002 |
| JP | 2002-236960 A | 8/2002 |
| JP | 2003-316465 A | 10/2002 |
| JP | 2003-319330 A | 11/2003 |
| JP | 2004-062771 A | 2/2004 |
| JP | 2004-086708 A | 3/2004 |
| JP | 2004-102562 A | 4/2004 |
| JP | 2004-112644 A | 4/2004 |
| JP | 2005-295564 A | 10/2005 |
| JP | 2006-053851 | 2/2006 |
| JP | 2006-150662 A | 6/2006 |
| JP | 2007-280391 A | 10/2007 |
| JP | 2008-004071 A | 1/2008 |
| JP | 2008/071338 A | 3/2008 |
| JP | 2008/257720 A | 10/2008 |
| JP | 2008/257721 A | 10/2008 |
| WO | WO 98/16884 A1 | 4/1998 |
| WO | WO 01/52473 A1 | 7/2001 |
| WO | WO 02/098671 A2 | 12/2002 |
| WO | WO 2006/021383 A1 | 3/2006 |

OTHER PUBLICATIONS

Communication Pursuant to Rule 44a EPC, dated Jun. 28, 2007 received in related European Application No. 07251463.1-2223 (10 pages).
U.S. Appl. No. 11/396,264, filed Mar. 31, 2006, Barrus et al.
U.S. Appl. No. 11/396,375, filed Mar. 31, 2006, Barrus et al.
U.S. Appl. No. 11/396,379, filed Mar. 31, 2006, Barrus et al.
U.S. Appl. No. 11/608,409, filed Dec. 8, 2006, Graham et al.
DATACARD® SP60 Card Printer, product brochure by Datacard Group (2004).
MP Mini Printers Series, LowpowerUltra-Compact Printer, product brochure by APS, revision 3.0 (Sep. 2004).
Nelson et al., "Palette: A Paper Interface for Giving Presentations," *Proceeding of CHI '99 Conf. on Human Factors in Computing Systems* ACM Press, pp. 354-361 (1999).
Newton-Dunn et al., "Block Jam," *SIGGRAPH 2002*, held in SAn Antonio, TX (2002).
Newton-Dunn et al., "Block Jam: A Tangible Interface for Interactive Music," *J. New Music Research*. 32(4):383-393 (2003).
Olympus & Polaroid digital printing camera: Digital Photography Review, downloaded from http://www.dpreview.com/news/0007/00072502c211zoom.asp on Apr. 5, 2007.
Rekimoto et al., "Data Tiles: A Modular Platform for Mixed Physical and Graphical Interactions," *Proceedings of SIGCHI '01*, Mar. 31 to Apr. 4, 2001, Seattle WA.
Sokoler et al., "Physically Embodied Video Snippets Supporting Collaborative Exploration of Video Material During Design Sessions," *Proceedings of NordCHI*, Oct. 19-23, 2002, held in Arhus Denmark (2002).
Ullmer et al., "mediaBlocks: Tangible Interfaces for Online Media," *Proceedings of CHI '99*, May 15-20, 1999.
U.S. Appl. No. 11/694,327, filed Mar. 30, 2007, Barrus et al.
U.S. Appl. No. 11/694,076, filed Mar. 30, 2007, Hart et al.
Non-Final Office Action for U.S. Appl. No. 11/396,375, Mailed Mar. 5, 2009, 12 pages.
Non-Final Office Action for U.S. Appl. No. 11/396,379, Mailed Dec. 24, 2008, 10 pages.
Non-Final Office for U.S. Appl. No. 11/694,076, Mailed Oct. 29, 2008, 21 pages.
Final Office Action for U.S. Appl. No. 11/694,076, Mailed Apr. 24, 2009, 24 pages.
Communication Pursuant to Rule 44a EPC, dated Aug. 7, 2007, received in related European Application No. 07105208.8-2223 (8 pages).
Extended European Search Report of Jul. 28, 2008 in European Application No. 08251133.8-2212.
Requirement for Restriction/Election for U.S. Appl. No. 11/396,379, mailed Nov. 13, 2008, 6 pages.
Non-Final Office Action for U.S. Appl. No. 11/396,379, mailed Jun. 10, 2009, 12 pages.
Requirement for Restriction/Election for U.S. Appl. No. 11/694,076, mailed Sep. 5, 2008, 6 pages.
Extended European Search Report in European Application No. 07113300.3-1228, Mailed Dec. 12, 2007, 5 pages.
"2 Dimensional Bar Code", Internet Archive Wayback Machine, archived on Jan. 24, 2002, 11 pages, at URL: http://web.archive.org/web/20020124190457/www.adams1.com/pub/russadam/stack.html.
Requirement for Restriction/Election for U.S. Appl. No. 11/495,613, mailed on Oct. 13, 2009, 6 pages.
Final Office Action for U.S. Appl. No. 11/396,375, mailed on Sep. 1, 2009, 16 pages.
How Computers Work, Millennium Edition. White, Ron. Que Publishing, Indianapolis, 1999. ISBN 0-7897-2112-0, 31 pages.
Exchangeable Image File Format for Digital Still Cameras: Exif Version 2.2. Japan Electronics and Information Technology Industries Association (JEITA). Prepared by: Technical Standardization Committee on AV & IT Storage Systems and Equipment, Apr. 2002, 154 pages.
Non-Final Office Action for U.S. Appl. No. 11/396,375 mailed on Mar. 1, 2013, 17 pages.
Notice of Allowance for U.S. Appl. No. 12/860,176 mailed on Mar. 19, 2013, 8 pages.
Final Office Action for U.S. Appl. No. 11/396,264, mailed on Mar. 31, 2010, 6 pages.
Non-Final Office Action for U.S. Appl. No. 11/396,379, mailed on Mar. 26, 2010, 17 pages.
Non-Final Office Action for U.S. Appl. No. 11/694,327, mailed on Apr. 13, 2010, 63 pages.
Final Office Action in commonly owned U.S. Appl. No. 12/860,176 mailed on Dec. 23, 2011, 34 pages.
Office Action in related Japanese application No. 2007-197790 dated Feb. 7, 2012, 6 pages.
Office Action in related Japanese application No. 2007-095183 dated Feb. 28, 2012, 3 pages.
Advisory Action in commonly owned U.S. Appl. No. 12/860,176 mailed on Mar. 8, 2012, 3 pages.
Final Office Action for U.S. Appl. No. 11/608,409 mailed on Jun. 8, 2012, 21 pages.
Advisory Action for U.S. Appl. No. 11/608,409 mailed on Aug. 31, 2012, 3 pages.
Non-Final Office Action for U.S. Appl. No. 12/860,176 mailed on Aug. 15, 2012, 32 pages.
Office Action in related Japanese Application No. 2008-086838 dated Jun. 25, 2013, 2 pages.
Notice of Allowance for U.S. Appl. No. 11/396,375 mailed on Jul. 9, 2013, 15 pages.
Non-Final Office Action for U.S. Appl. No. 11/694,327 mailed on Nov. 23, 2012, 36 pages.
Office Action in related Japanese application No. 2008-086838 dated Nov. 13, 2012, 2 pages.
Non-Final Office Action in commonly owned U.S. Appl. No. 11/608,409 mailed on Nov. 16, 2011, 18 pages.
Office Action in related Japanese Application No. 2007-096738 dated Oct. 4, 2011, 3 pages.
Supplemental Notice of Allowance for U.S. Appl. No. 12/860,176 mailed on May 2, 2013, 5 pages.
Final Office Action for U.S. Appl. No. 11/694,327 mailed on Jun. 4, 2013, 34 pages.
"Exchangeable image file format for digital still cameras: Exif Version 2.2," JEITA CP-3451, Standard of Japan Electronics and Information Technology Industries Association, Apr. 2002, pp. 1-148.
White, "How Computers Work," Millennium Edition, Copyright 1999, 37 pages.
Notice of Allowance for U.S. Appl. No. 11/495,613, mailed on Jul. 1, 2010, 18 pages.
Non-Final Office Action for U.S. Appl. No. 11/396,264, mailed on Aug. 4, 2010, 5 pages.

(56) References Cited

OTHER PUBLICATIONS

Final Office Action for U.S. Appl. No. 11/396,375, mailed on Aug. 2, 2010, 213 pages.
Final Office Action for U.S. Appl. No. 11/694,327, mailed on Oct. 13, 2010, 70 pages.
U.S. Appl. No. 12/860,176, filed Aug. 20, 2010, Piersol et al.
Final Office Action for U.S. Appl. No. 11/608,409, mailed on Jun. 9, 2010, 23 pages.
Final Office Action for U.S. Appl. No. 11/694,076, mailed on May 10, 2010, 17 pages.
Erol et al. "Prescient Paper: Multimedia Document Creation with Document Image Matching" 17th International Conference on Pattern Recognition (2004), pp. 1-4.
Gormish et al. "An E-Writer for Documents Plus Strokes" ACM doc Eng (2009), pp. 1-4.
Piersol, K. "Object Oriented Spreadsheets" ACM OOPSLA Proceedings (1986), pp. 1-6.
Office Action in commonly owned Japanese Application No. 2007-197788 dated Jul. 26, 2011, 2 pages.
Non-Final Office Action in commonly owned U.S. Appl. No. 12/860,176 mailed on Jul. 15, 2011, 30 pages.
Final Office Action for U.S. Appl. No. 11/396,264, mailed on Feb. 8, 2011, 15 pages.
Advisory Action for U.S. Appl. No. 11/694,327, mailed on Dec. 21, 2010, 3 pages.
Lange et al., "Insight Lab: An Immersive Team Environment Linking Paper, Displays, and Data," Proceedings of the 1998 Conference on Human Factors in Computing Systems, 1998, 8 pages.
Internet Archive Wayback Machine archive of "How Computers Work: The CPU and Memory," available at URL: http://web.archive.org/web/20031215230244/http://homepage.cs.uri.edu/faculty/wolfe/book/Readings/Reading04.htm, archived on Dec. 15, 2003, 7 pages.
Nelson et al., "Palette: A Paper Interface for Giving Presentations," Proceedings of the CHI Conference on Human Factors in Computing Systems, May 1999, 8 pages.
Non-Final Office Action for U.S. Appl. No. 11/396,375, mailed on Feb. 22, 2010, 15 pages.
Non-Final Office Action for U.S. Appl. No. 11/608,409, mailed on Jan. 6, 210, 31 pages.
Non-Final Office Action for U.S. Appl. No. 11/495,613, mailed on Dec. 31, 2009, 39 pages.
Non-Final Office Action for U.S. Appl. No. 11/396,264, mailed on Oct. 29, 2009, 16 pages.
Advisory Action for U.S. Appl. No. 11/396,375, mailed on Nov. 18, 2009, 3 pages.
Final Office Action for U.S. Appl. No. 11/396,379, mailed on Dec. 15, 2009, 14 pages.
Non-Final Office Action for U.S. Appl. No. 11/694,076, mailed on Nov. 2, 2009, 18 pages.
Meher et al., "*A New Approach to Secure Distributed Storage, Sharing and Dissemination of Digital Image*", May 2066, IEEE International Symposium on Circuit and Systems, ISCAS 2006, pp. 373-376.
Notice of Allowance for U.S. Appl. No. 11/608,409 mailed on Jan. 27, 2014, 9 pages.
Notice of Allowance for U.S. Appl. No. 11/694,327 mailed on Jan. 31, 2014, 27 pages.
Notice of Allowance for U.S. Appl. No. 11/608,409 mailed on Oct. 8, 2013, 9 pages.
U.S. Appl. No. 14/307,346 filed Jun. 17, 2014 by Barrus et al.
Non-Final Office Action for U.S. Appl. No. 11/694,076 mailed on Jun. 12, 2014, 16 pages.
Final Office Action, mailed on Dec. 29, 2014, U.S. Appl. No. 11/694,076, 16 pages.
Office Action, mailed on Aug. 21, 2015. U.S. Appl. No. 14/307,346, 53 pages.
Notice of Allowance for U.S. Appl. No. 14/307,346 mailed on May 4, 2016, 27 pages.
Wang et al., "A Key-Recovery System for Long-term Encrypted Document", Oct. 2006, 10th IEEE International Enterprise Distributed Object Computing Conference Workshops, pp. 52-55.
Non-Final Office Action for U.S. Appl. No. 11/694,076 mailed on Sep. 22, 2016, 22 pages.

\* cited by examiner

TRANSMISSION OF MEDIA KEYS

CROSS-REFERENCES TO RELATED APPLICATIONS

This application herein incorporates by reference for all purposes the entire contents of the following applications:
(1) U.S. Non-Provisional application Ser. No. 11/396,264 titled "TECHNIQUES FOR GENERATING A MEDIA KEY" filed Mar. 31, 2006, now abandoned;
(2) U.S. Non-Provisional application Ser. No. 11/396,375 titled "TECHNIQUES FOR USING MEDIA KEYS" filed Mar. 31, 2006, now issued as U.S. Pat. No. 8,554,690 on Oct. 8, 2013; and
(3) U.S. Non-Provisional application Ser. No. 11/396,379 titled "CAMERA FOR GENERATING AND SHARING MEDIA KEYS" filed Mar. 31, 2006, now abandoned.

BACKGROUND OF THE INVENTION

The present invention relates to information processing techniques and more particularly to techniques for transmitting electronic media keys generated for media data.

The amount of information stored in digital format is ever increasing as an ever increasing number of applications and devices are available that can capture and process digital information. There is thus a growing need for improved interfaces and techniques for accessing, distributing, sharing, etc, the digital information. For example, even in this digital age, many people still prefer to hand out photographic prints instead of disks full of digital images. Apart from the "fun" aspect of photograph prints, many people still feel more comfortable handling physical objects rather then digital information. A photographic print also offers more convenience since it does not require access to a computer and does not require any special reader application to view the photo. Accordingly, improved interfaces and mechanisms are desired for accessing and sharing digital media data.

BRIEF SUMMARY OF THE INVENTION

Embodiments of the present invention provide techniques for communicating electronic media keys from one device to another.

A source device may comprise user-selectable options for initiating transmission of one or more electronic media keys to a target device. The target device may comprise different mechanisms for indicating that transmission of a media key is in progress and also to indicate successful transmission. Various actions may be performed in response to transmission of media keys.

According to an embodiment of the present invention, techniques are provided for transmitting an electronic media key. Indication is provided on a first device of initiation of transmission of an electronic media key to the first device from a second device, the electronic media key comprising a data identifier and a decryption key. Indication is provided on the first device of completion of the transmission of the electronic media key from the second device to the first device.

Various actions may be performed using the transmitted media key. Media data corresponding to the data identifier may be printed using the first device. The first device may be a digital display and media data corresponding to the data identifier is displayed on the digital display. The first device may be a projector and media data corresponding to the data identifier is output using the projector. The first device may be storage device and media data corresponding to the data identifier is stored on the storage device.

The electronic media key may be transmitted from the first device to a third device. In one embodiment, the first device may store the electronic media key and then communicate the electronic media key to the third device when a set of one or more conditions are met. For example, the media key or the corresponding media data may be communicated according to a schedule.

In one embodiment, completion of the transmission to the first device may be indicated by displaying media data corresponding to the data identifier on the first device.

According to an embodiment of the present invention, techniques are provided for communicating a media key. A data identifier for media data is determined at a first device. A decryption key is determined at the first device. An electronic media key is generated at the first device comprising the data identifier and the decryption key. A signal to communicate the electronic media key from the first device to a second device is received at the first device. The electronic media key is communicated from the first device to the second device responsive to the signal.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention facilitate processing of media data. According to an embodiment of the present invention, techniques are provided for generating and using media keys that facilitate distribution, sharing, accessing, outputting, creating, and/or performing other operations on media data. A media key may be generated for media data. A media key created for specific media data facilitates access to the specific media data. A media key may be created as a digital or electronic object or a physical object. A media key serves as a token that can be used to access media data for which the media key has been created. A user may use a media key to access the media data corresponding to the media key and possibly perform operations on the media data.

The media data for which a media key is created may comprise one or more different types of information including but not restricted to audio information, video information, image information, slide information, text information, etc. or combinations thereof. The media data for which a media key is created may comprise one or more media items. Examples include but are not restricted to a video clip, an audio clip, a movie, a photo, a slide, a document, contact information, business card information, a presentation (e.g., a Microsoft PowerPoint presentation), etc. or combinations thereof. A media item may also be a collection of other media items (e.g., a media item may comprise information pointing to other media items. For example, a photo album may comprise a collection of images, a slide presentation may comprise a set of slides and accompanying music, etc.

Figure 1A:
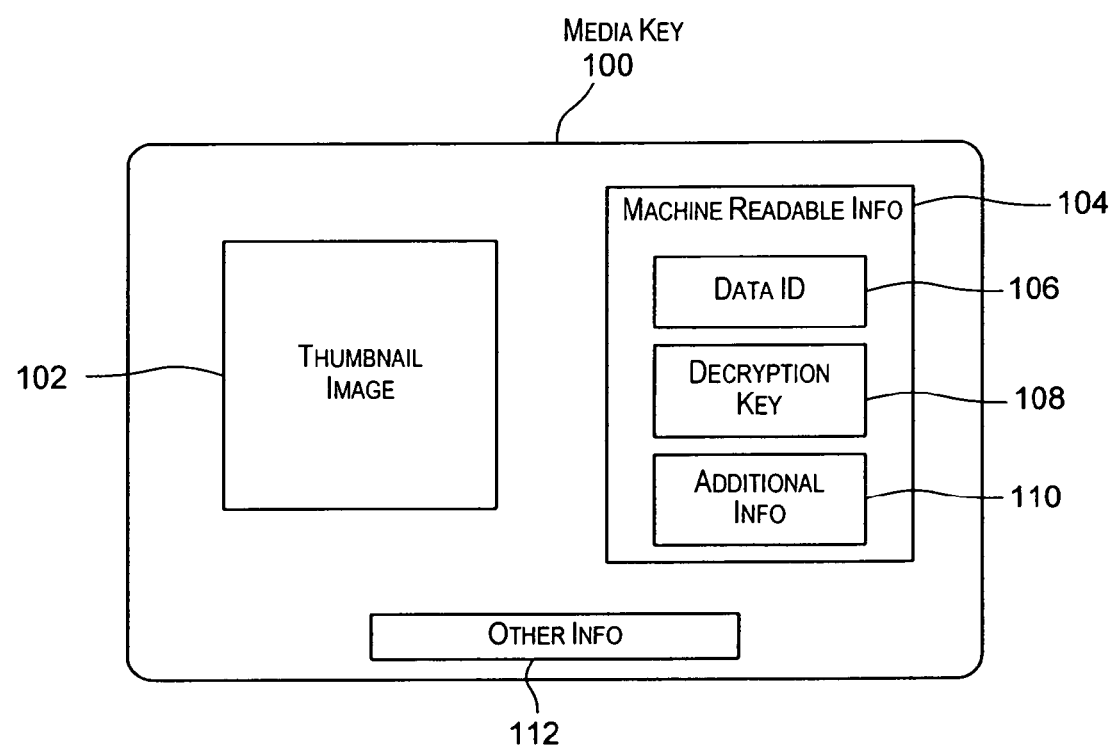
FIGS. 1A, 1B, 1C, 1D, 1E, and 1F depict various media keys according to embodiments of the present invention.

FIG. 1A depicts a media key 100 according to an embodiment of the present invention. Media key 100 may be generated for some media data. The media data may be stored in some storage location, such as on a server. Media key 100 depicted in FIG. 1A comprises a thumbnail image 102 and machine readable information 104. In one embodiment, thumbnail image 102 provides a unique visual human-readable indication of the contents of the media data for which the media key is created. For example, if the media key is created for a digital image, then thumbnail image 102 may be a representation of the image. As another example, if the media key is created for a song audio clip, then thumbnail image 102 may comprise the title of the song, information about the singer, artwork for album in which the song appears, or some other information related to the song that a human may use to determine the contents of the media data for which the media key is created. As another example, if the media data for which the media key is created comprises a collection of photos, then thumbnail image 102 may depict a collection of photos. Thumbnail image 102 thus provides a visual indication of the one or more media items included in the media data for which the media key is created. In this manner, thumbnail image 102 provides a visual cue to a user as to the contents of the media data for which the media key is created. The presence of thumbnail image 102 on media key 100 is optional.

Machine readable information 104 comprises information that can be read by a machine. Machine readable information 104 may comprise text, an image, a symbol, a barcode, a glyph, and the like, and combinations thereof. According to an embodiment of the present invention, machine readable information 104 associated with media key 100 comprises information that can be used to access the media data for which the media key is created.

Different techniques may be used to associate machine readable information 104 with media key 100. In one embodiment, the machine readable information may be printed on the media key. For example, a machine readable identifier (e.g., a barcode) may be generated and printed on the media key. In other embodiments, the media key may comprise a radio frequency identifier (RFID) tag that is either attached to the media key. For example, an RFID tag may be glued to the media key, stapled to the media key, pinned to the media key, or even embedded in the media key. In such an embodiment, the machine readable information may be associated with the media key by being stored in the memory of the RFID tag attached to the media key. Other techniques may also be used to associate the machine readable information with a media key.

Machine readable information 104 may comprise a data identifier 106 that may be used to access the media data for which the media key has been created. For example, the media data corresponding to the media key may be stored as a file on a server and the data identifier 106 may be used to locate the file on the server.

Different techniques may be used to generate data identifier 106 for a media key. According to one technique, the data identifier for a media key is generated based upon the media data for which the media key is created. For example, a cryptographic hash (e.g., an MD5 hash, an SHA1 hash) may be applied to the media data for which the media key is being created to generate the data identifier for the media key. Using a cryptographic hash prevents collisions in data identifiers. Other attributes of the media data may also be used to generate a data identifier for the media data. Examples of such attributes include but are not restricted to date or time when the media data was created, a user name, etc. and combinations thereof.

A data identifier for media data may also be generated using information not related to the media data. For example, techniques that are capable of generating unique values may also be used to generate a data identifier. In some instances, a data identifier may be generated prior to capture or identification of the media data. For example, a list of pre-determined data identifiers may be provided and when a data identifier from the list may be assigned to media data at the time of creating a media key for the media data.

The data identifier may be generated by different systems. In one embodiment, the data identifier may be generated by the server on which the media data is stored. In another embodiment, an identifier generator system/service may be used to generate a data identifier. In another embodiment, data identifier 106 may be generated by the system or device that is used for creating a media key. Any of the techniques described above may be used to generate the data identifier. For example, a system configured to create media keys may apply a cryptographic hash (e.g., an MD5 hash, SHA1 hash) to the media data for which a media key is being created to generate the data identifier. The data identifier may then be formatted as machine readable information 104 that is associated with media key 100 during generation of the media key.

In some embodiments, machine readable information 104 may optionally comprise a decryption key 108. The decryption key may be present in embodiments where the media data is stored in encrypted form. Decryption key 108 may be used to decrypt the encrypted media data. The media data may be encrypted using a symmetrical encryption technique, in which case decryption key 108 is the same as the encryption key that is used to encrypt the media data. In such embodiments, for a given media key, the data identifier 106 encoded in the machine readable information associated with the media key may be used to access the encrypted media data corresponding to the media key and the decryption key 108 encoded in the machine readable information associated with the media key may be used to decrypt the encrypted media data.

Machine readable information 104 may also optionally comprise additional information 110. Additional information 110 may comprise information related to the media data such as metadata or other contextual information for the media data. For example, additional information 110 may identify the storage location (e.g., identify a server) where the media data corresponding to the media key is stored. In such an embodiment, additional information 110 may be used to access the media data corresponding to the media key. Additional information 110 may also identify the media data type (e.g., audio data, video data, etc.). This information may be useful for identifying an application or output device for outputting the media data. Additional information 110 may also comprise other types of information such as information identifying an action/command to be performed using the media data, workflow information, etc. Additional information 110 may also comprise information that is specific to applications that are configured to perform operations on the media data. For example, additional information 110 may identify an application that is used to create the media key, which user created the media key, date when the media key was created, etc.

Other information 112 may also be printed on media key 100. Information 112 may include different types of information and may be human-readable. For example, in one embodiment, other information 112 may identify the type of media data or the media item(s) included in the media data corresponding to the media key. For example, for a media key created for a photo, other information 112 may state "Photo". This provides information to the user of the media key as to the nature of the contents of the media data corresponding to the media key. As previously described, a media key may be created for media data comprising a collection of media items (e.g., a collection of photos). In this case, other information 112 may state "Collection". In the case of a collection, other information 112 may also possibly indicate the number of media items in the collection. Other information 112 may also include other types of information such as information identifying a storage location (e.g., a directory location) or filename of the corresponding media data, characteristics about the media data, etc. Other information 112 may also identify the primary mime-type of the media data, the date or time when the media key (or corresponding media data) was created or shared.

A media key, such as media key 100 depicted in FIG. 1A, may be created as a physical object or a digital/electronic object. For example, as a physical object, media key may be a piece (e.g., a card) of plastic, paper, etc. having a thumbnail image and machine readable information associated with it. As previously described, there are different ways in which the machine readable information is associated with the media key. The machine readable information may be printed on the media key (e.g., a barcode encoding the information may be printed on the media key). In an alternative embodiment, the machine readable information may be stored in the memory of a tag (e.g., a RFID tag) attached (including being embedded in the media key) to the media key.

In other embodiments, a media key may also be a digital or electronic object that may be displayed on a screen. An electronic media key may also be electronically transmitted from one device to another.

Figure 1B:
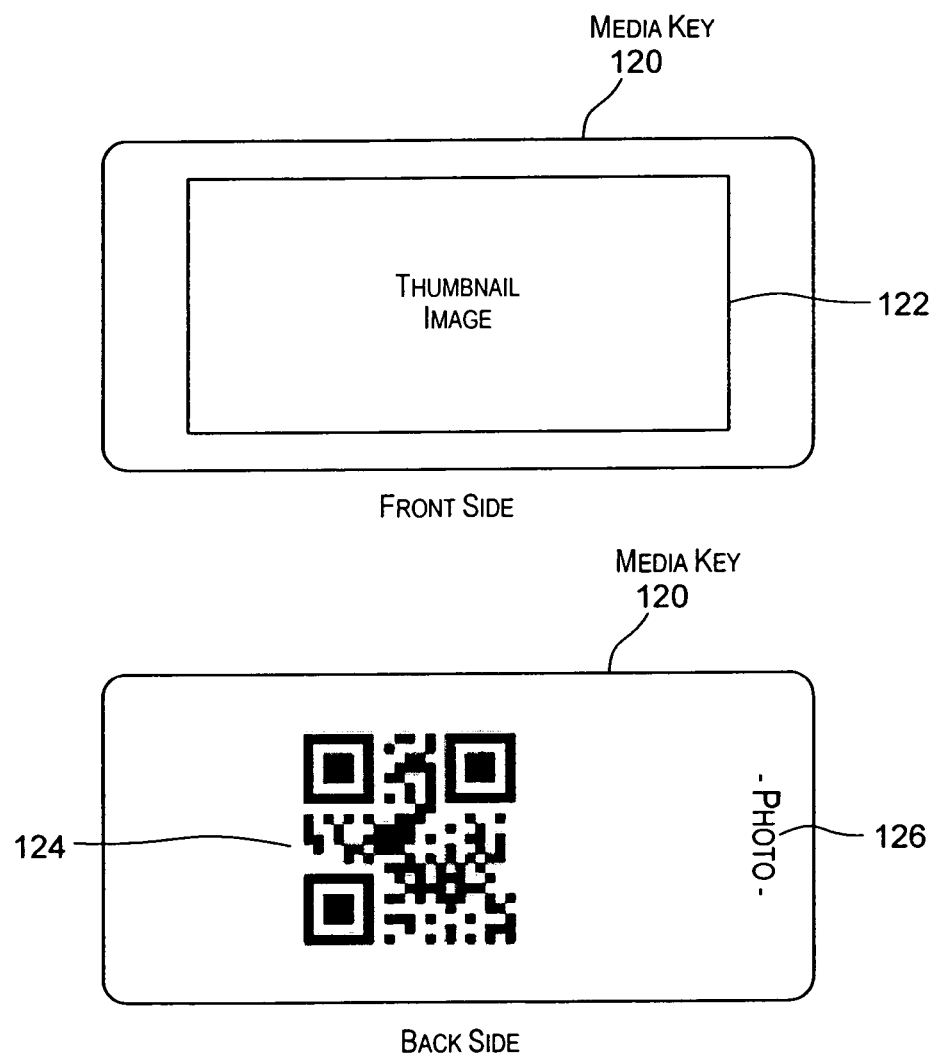

A media key may take different forms. Different layouts may be used to print information on a media key. FIG. 1B depicts a media key 120 according to an embodiment of the present invention. Media key 120 has thumbnail image 122 printed on one side of the media key and machine readable information 124 and other information 126 printed on the other side of the media key. This layout enables a reader to view thumbnail image 122 while a media key reader may scan the back side of the media key to read machine readable information 124.

In FIG. 1B, the machine readable information is encoded into a machine readable identifier 124 that is printed on the back side of the key. The identifier depicted in FIG. 1B is a QR code barcode. Other information 126 printed on the media key states "Photo" thereby indicating that the media data corresponding to the media key comprises a photo media item. This provides useful information to the user of the media key as to the contents of the media data corresponding to the media key.

Figure 1C:
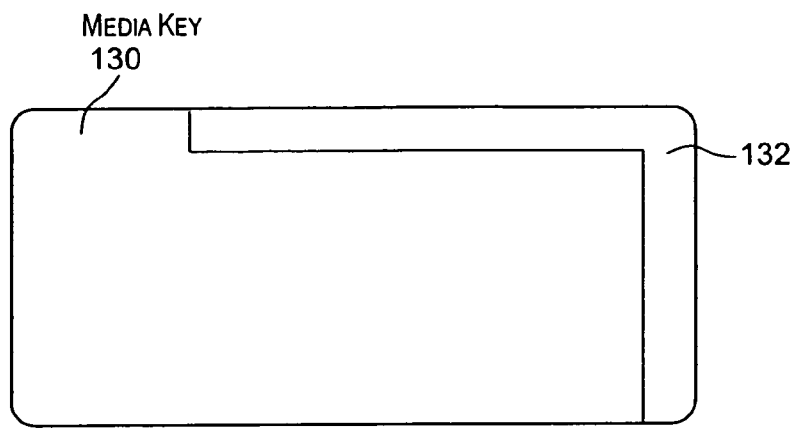

Media keys may be provided in various different forms and shapes. For example, in the media key depicted in FIG. 1A, the machine readable information and thumbnail image both appear on the same side of the key whereas in the media key depicted in FIG. 1B the thumbnail image and machine readable information appear on opposite sides of the media key. The information printed on a media key may vary in different embodiments. In one embodiment, various markings such as colors, symbols, etc. may be printed on the media key to represent the type of the media data corresponding to a media key. For example, if a first media key is created for a photo, a first color (e.g., red) designated for photo media may be printed on the media key to indicate that the media item is a photo. A colored stripe in the first color may be printed on the media key. For example, as depicted in FIG. 1C, a colored stripe 132 is printed along a side of media key 130. A second media key created for a video clip may have a different color (e.g., green) designated for video media printed on it to indicate that the media item is a video clip. In this manner, different colors may be used to represent different media items or media data types. If the media data corresponding to a media key comprises different information types or different media items, then multiple colors may be printed on the media key, one for each media item type. Alternatively, a color representing the primary media type may be printed on the key. The colors enable a user to easily sort and differentiate media keys corresponding to different types of media data.

In other embodiments, different symbols or markings may be printed on a media key to indicate the type of media items or information included in the media data corresponding to the media key. The purpose of these markings is to enable a user to easily determine the type of information included in the media data corresponding to the media key by looking at the symbol(s) or marking(s) or colors printed on the media key.

Media keys may also be of different shapes and sizes. In one embodiment, the shape and/or size of a media key may identify the type of information or media items included in the media data corresponding to the media key. Media keys may come in jigsaw shapes, triangles, circles, rectangles, irregular shapes, etc. In some embodiments, the shape and/or side of a media key may also encode the data identifier for the media data corresponding to the media key.

Figure 1D:
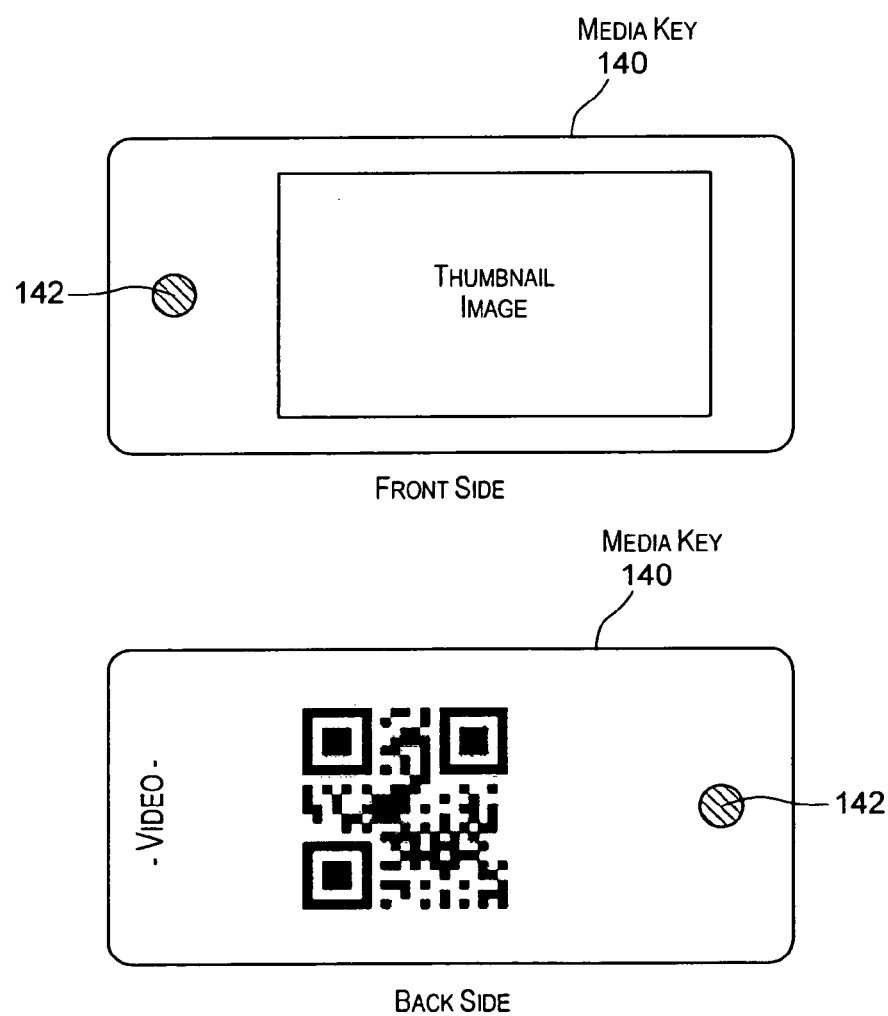
Figure 1E:
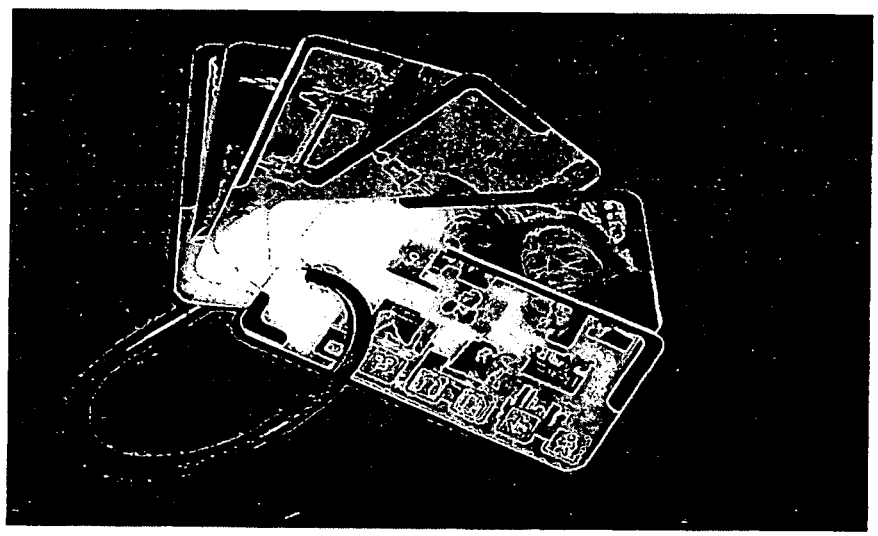
Figure 1F:
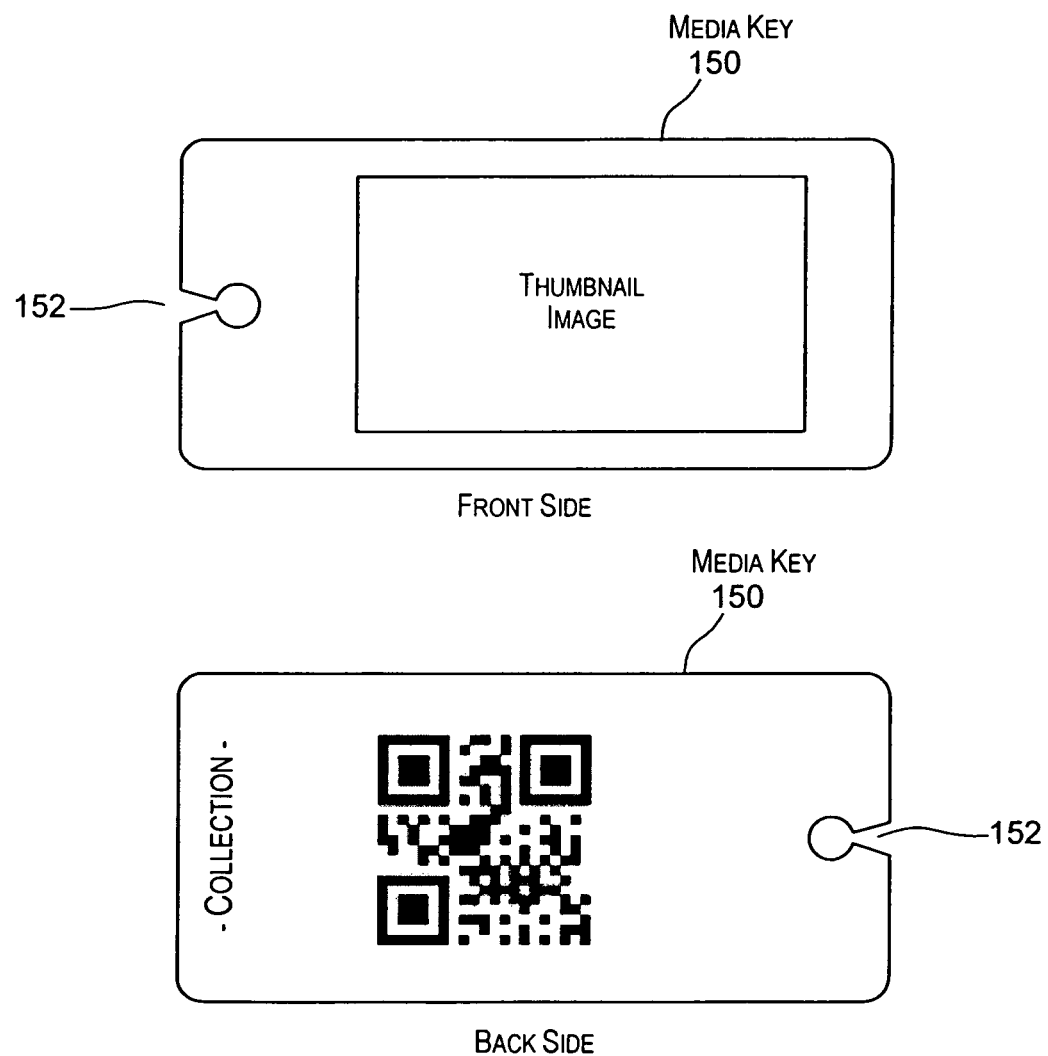

FIGS. 1D and 1F depict further examples of media keys according to embodiments of the present invention. Media key 140 depicted in FIG. 1D has a hole 142 in it that enables the media key to be kept on a rope or keychain (as shown in FIG. 1E). A keychain may thus provide a convenient mechanism for holding several such media keys, for example, media keys corresponding to photos in an album. In one embodiment, the first media key in a keychain stack may correspond to media data for the full album and successive media keys may correspond to individual photos in the album. The thumbnail image on the first media key may depict a collection of photos. Media key 150 depicted in FIG. 1F has a specially shaped notched hole 152 shaped like a bread tab. The bread tab facilitates addition and removal of the media key from a keychain, rolodex, etc.

The media keys depicted in FIGS. 1A through 1F are merely illustrative of embodiments incorporating the present invention and are not intended to limit the scope of the invention as recited in the claims. One of ordinary skill in the art would recognize other variations, modifications, and alternatives.

Figure 2:
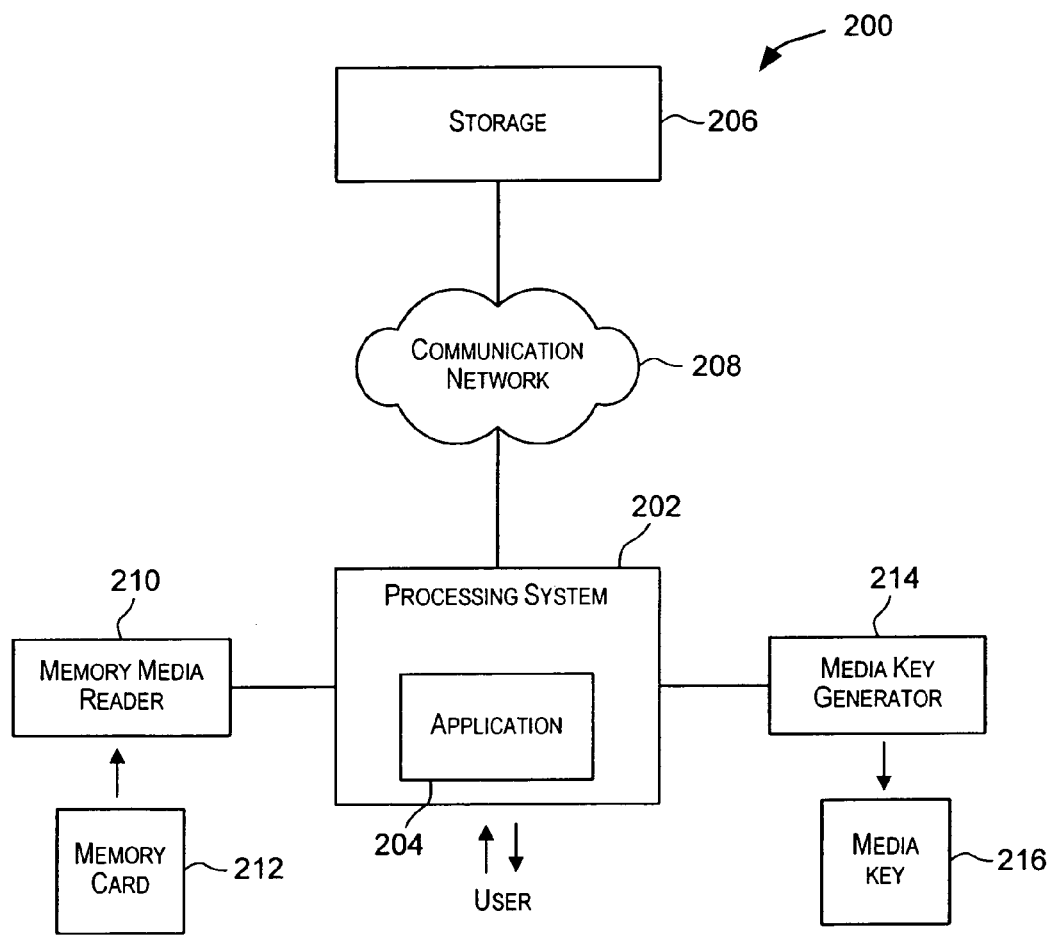
FIG. 2 is a simplified block diagram of a system that may be used to generate media keys according to an embodiment of the present invention.

FIG. 2 is a simplified block diagram of a system 200 that may be used to generate media keys according to an embodiment of the present invention. System 200 depicted in FIG. 2 is merely illustrative of an embodiment incorporating the present invention and is not intended to limit the scope of the invention as recited in the claims. One of ordinary skill in the art would recognize other variations, modifications, and alternatives.

As depicted in FIG. 2, a processing system 202 is provided for performing processing for creating a media key. Processing system 202 may comprise a processor and a memory subsystem and possibly other subsystems. The processor may execute one or more applications. An application 204 executing on a processing system 202 may enable a user to initiate generation of media keys. The user may interact with application 204 via input devices (e.g., mouse, keyboard) of processing system 202. For example, the user may select the media data for which a media key is to be created using a mouse connected to processing system 202. Application 204 may then use the user-provided information to cause generation of a media key. Information may be output to the user via one or more output devices of processing system 202.

The media data selected for media key creation may be stored locally or remotely from processing system 202. For example, the media data may be stored in storage 206 that may be coupled to processing system 202 via communication network 208. Storage 206 may comprise one or more servers storing data.

Communication network 208 may be a local area network (LAN), a wide area network (WAN), a wireless network, an Intranet, the Internet, a private network, a public network, a switched network, or any other suitable communication network. Communication network 208 may comprise many interconnected computer systems (which may also store the media data) and communication links such as hardwire links, optical links, satellite or other wireless communications links, wave propagation links, or any other mechanisms for communication of information. Various communication protocols may be used to facilitate communication of information via communication network 208, including TCP/IP, HTTP protocols, extensible markup language (XML), wireless application protocol (WAP), protocols under development by industry standard organizations, vendor-specific protocols, customized protocols, and others.

The media data selected for creating a media key may also be stored by processing system 202. The media data may also be stored on other storage media such as removable memory media such as memory cards, disks, drives, CDs, DVDs, etc. Apparatus may be coupled to processing system 202 that is capable of reading the media data from such storage media. For example, as depicted in FIG. 2, a memory media reader 210 may be coupled to processing system 202. Memory media reader 210 may be configured to accept a memory medium such as a memory card 212 and read data stored on the memory card. The data stored on the card may be displayed to the user by application 204 and the user may then select the data for which a media key is to be created. In one embodiment, the selected data may be uploaded to some server from the removable memory media.

Processing system 202 may create or determine a unique data identifier for the media data for which the media key is to be generated. The data identifier that is determined is such that it can be used to access the media data for which the media key is being created. The data identifier may be of any length greater than zero. In one embodiment, the data identifier is 128 bits long.

In one embodiment, the data identifier for the media data is generated by processing system 202. Processing system 202 may be configured to create the data identifier based upon the selected media data. For example, in one embodiment, processing system 202 may apply a cryptographic hashing algorithm (e.g., an MD5 hash) to the media data which results in the generation of a unique data identifier for the data. In this manner, the contents of the media data are used to generate the data identifier. As previously described, different techniques may be used to determine the data identifier for a media key.

In other embodiments, data identifier for the media data may be generated by the server storing the media data and provided to processing system 202. In yet other embodiments, an identifier generation system/service may be used to generate the data identifier for the media data selected by the user. The generated data identifier may be provided to processing system 202.

In some instances, the selected media data may be stored in encrypted form. In such instances, processing system 202 is configured to determine a decryption key that can be used to decrypt the encrypted data. In some embodiments, processing system 202 may be configured to encrypt the media data. In such embodiments, processing system 202 may encrypt the media data to form encrypted media data and the encrypted media data may then be uploaded/stored in a memory location from where it can be subsequently accessed. The decryption key that may be used to decrypt the data may be generated by processing system 202 or may be provided to processing system 100 possibly by the user. A symmetric encryption algorithm may be used to encrypt the media data, in which case the decryption key is same as the encryption key.

Processing system 202 may also determine additional information, if any, to be included in the machine readable information for the media key. As previously described, the additional information may include various types of information including metadata related to the media data, contextual information, etc.

Processing system 202 may also be configured to generate a thumbnail image to be printed on the media key to be created. As previously described, the thumbnail image is created such that it provides a human-readable visual representation of the contents of the media data for which the media key is created. The thumbnail image thus provides a visual cue to the user as to the contents of the media data for which the media key is created.

Processing system 202 is configured to generate machine readable information to be associated with the media key. The machine readable information may include the data identifier, the decryption key, and additional information. In one embodiment, processing system 202 may generate a machine readable identifier such as a barcode that encodes the data identifier, decryption key, and additional information. In other embodiments, the machine readable information comprising the data identifier, the decryption key, and the additional information may be written to a tag such as an RFID tag that is associated with the new media key.

Processing system 202 then causes a media key to be generated using the thumbnail image and the machine readable information. Processing system 202 may generate an electronic media key or a physical media key. In one embodiment, processing system 202 is configured to forward the thumbnail image and the machine readable information to a media key generator 214. Media key generator 214 is then configured to create a physical media key 216 where the thumbnail image is printed on the media key and the machine readable information is associated (e.g., printed on the media key, or stored in a tag attached to the media key) with the media key.

The machine readable information may be associated with the media key in various ways. For example, a barcode may be generated encoding the data identifier, and optionally the decryption key and additional information. The barcode may then be printed on the media key. In embodiments where an RFID tag is used, the machine readable information comprising the data identifier, decryption key, and additional information is written to the RFID tag that is attached to the media key being created.

A media key may be created as a physical object or a digital/electronic object. The digital media key may be displayed to the user via an output device (e.g., a screen, a monitor) of processing system 202 or may be transmitted to some target device.

Figure 3:
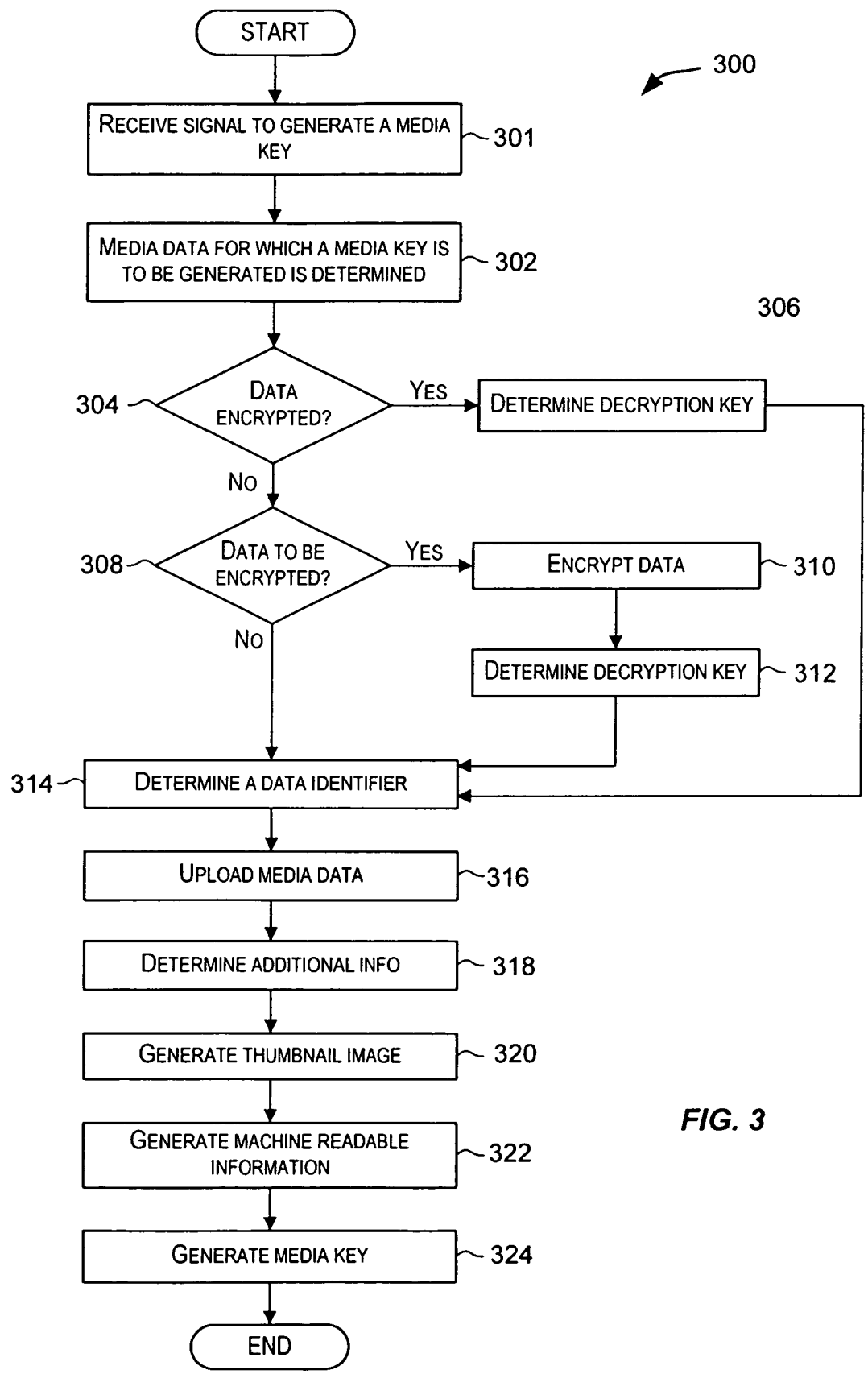
FIG. 3 is a simplified high-level flowchart depicting processing for generating a media key according to an embodiment of the present invention.

FIG. 3 is a simplified high-level flowchart 300 depicting processing for generating a media key according to an embodiment of the present invention. The processing may be performed by software modules (code, instructions), hardware modules, or combinations thereof. The processing depicted in FIG. 3 may be performed by a system such as system 200 depicted in FIG. 2. Flowchart 300 depicted in FIG. 3 is merely illustrative of an embodiment of the present invention and is not intended to limit the scope of the present invention. Other variations, modifications, and alternatives are also within the scope of the present invention.

As depicted in FIG. 3, processing is initiated upon receiving a signal to generate a media key (step 301). Various events may trigger a signal to generate a media key. The signal may be generated in response to a request received from a user to generate a media key. The signal may also be triggered automatically in response to various events. For example, media key generation may be triggered upon receiving an email, upon detecting presence of voicemail, upon capturing an image, etc. For example, whenever a voice mail is left, a signal may be triggered to generate a media key for the voice mail. The signal to generate a media key may be generated by a device, an apparatus, process, program, application, etc.

The media data for which a media key is to be generated is determined (step 302). In one embodiment, a user may identify the media data for which a media key is to be created. In other embodiments, the media data may be identified by a device, system, or process, etc. with or without any user involvement. For example, if the media data represents a voice mail on a phone system, the system may be configured to automatically select the voice mail for media key creation.

A determination is then made if the media data determined in 302 is in encrypted form (step 304). If the data is encrypted, then a decryption key that can be used to decrypt the data is determined (step 306). Processing then continues with step 314.

If it is determined in 304 that the media data is not encrypted, then a check is made to see if the media data determined in 302 is to be encrypted (step 308). If it is determined that the media data is to be encrypted, then the data is encrypted (step 310). The key used for performing the encryption may be randomly generated or may be provided. A decryption key is determined that can be used to decrypt the encrypted data (step 312). A symmetric encryption scheme may be used to encrypt the data in 310 so that the decryption key that can be used to decrypt the data is same as the encryption key that is used to encrypt the data.

A data identifier is then determined for the media data (step 314). The data identifier is generated such that it can be used to access the media data for which the media key is being generated. For example, the data identifier may point to storage location where the media data is stored. For example, if the media data corresponding to the media key is stored in a file on a server, the data identifier generated in 314 may be used to locate the file on the server.

As previously described, different techniques may be used to generate a data identifier. The data identifier may be generated by different systems such as a system that is configured to generate media keys, a server such as a storage server where the media data is stored, a centralized identifier generator system/service, and other systems. In one embodiment, the data identifier may be generated using the media data for which a media key is being created. For example, a data identifier may be generated by calculating a cryptographic hash (e.g., an MD5 or SHA1 hash) for the media data. Cryptographic hash functions create unique data identifiers. If the media data is encrypted, then the data identifier is generated using the encrypted media data. Other techniques that do not use the media data itself may also be used to determine a data identifier.

Using a cryptographic hashing technique to generate the data identifier provides several advantages. If the media data is unencrypted and a specific hashing technique is used (like SHA1 or MD5), then the hash created for the media data may be used to point to the media data without revealing the media data. For instance, if two users both have access to the same media data and the hash is based on the unencrypted media data, one user can use the hash as a pointer to the specific media data without revealing the data. For instance, a user A can send information to user B about where a photo was taken and indicate which photo user A is referring to by sending the hash generated based upon the photo instead of sending the photo itself. User B can look at the hashes of the locally stored photos to determine which photo user A is referring to or use the hash to access the photo.

Using the media data itself to generate the hash which is used as the data identifier guarantees, in almost all instances, that the data identifier is unique for that media data. This eliminates the need for getting identifiers from a central server in order to avoid collisions or identifier reuse. It should be noted that other techniques for creating unique identifiers may also be used for generating a data identifier. These techniques may use the media data or its related attributes or other information to generate unique values that are then used as data identifiers. For instance, using time and date, a unique username, email address, or other information and combinations thereof may be used. A cryptographic hash may be calculated for the information to generate a unique identifier that points uniquely to the media data.

The media data (either in encrypted or non-encrypted form) for which the media key is being generated may then optionally be uploaded to some storage location (step 316). For example, in one embodiment, the media data for which a media key is being generated may be uploaded to a server (e.g., a server connected to the Internet). In one embodiment, the data identifier determined in 314 may be used to determine a storage location for the media data such that the media data is accessible using the data identifier.

In alternative embodiments, the data identifier may be determined after uploading the media data (i.e., step 316 may be performed before step 314). For example, the media data may be uploaded to some memory storage location and then a data identifier may be generated that can be used to access the media data from the memory storage location.

In some embodiments, a storage service may also be used to store the media data. The media data to be stored may be provided to a storage service which may then store the data and generate a data identifier that can be subsequently be used to access the stored media data.

Additional information, if any, to be included in the machine readable information for the media key is then determined (step 318). The additional information may include a variety of information. In one embodiment, the additional information may comprise metadata related to the media data or other contextual information related to the media data for which a media key is being created. In another embodiment, the additional information may identify the storage location (e.g., identify a server) and/or a filename storing the media data. Additional information may also identify an action or command to be performed using the media data. Additional information may also comprise information that is specific to applications that are configured to perform operations on the media data. Additional information may also comprise other information such as workflow information. Additional information may also comprise or point to versioning information for the media data. The versioning information may indicate if the media data has changed or the version of the media data.

A thumbnail image is generated for the media data determined in 302 (step 320). As previously described, the thumbnail image may be created such that it provides a human-readable visual representation indicative of the contents of the media data for which the media key is created. The thumbnail image provides a visual cue to the user as to the contents of the media data selected by the user in 302.

Machine readable information is then generated based upon the data identifier determined in 304, and optionally based upon the decryption key determined/generated in steps 306 or 312 and the additional information determined in step 318 (step 322). In one embodiment, a machine readable identifier is generated that encodes the data identifier and optionally the decryption key and the additional information. For example, a barcode (e.g., a QR code which is a 2-dimensional barcode) may be generated. The barcode may encode the data identifier, the decryption key, and additional information.

In embodiments where an RFID tag is used, the data identifier and optionally the decryption key and the additional information may be converted into machine readable information that can be written to the RFID tag that is attached to the media key.

A media key is then created using the thumbnail generated in 320 and the machine readable information generated in 322 (step 324). The media key may be created as a physical object or an electronic object. As part of 324, the thumbnail image is printed on the media key. The machine readable information is associated with the media key. In one embodiment, the machine readable information is associated with the media key by printing the machine readable information on the media key. For example, a barcode encoding the machine readable information is printed on the media key. In embodiments where RFID tags are used, the machine readable information may be written to the tag that is attached to the media key.

Other information (reference 112 in FIG. 1A and previously described) may also be printed on the media key such as information identifying the type of information included in the media data or the media items included in the media data. Color or symbols may be printed on the media key to indicate information related to the contents of the media data corresponding to the media key.

Different layouts may be used for printing information on a media key. For example, in one embodiment, the thumbnail image and the machine readable information may be printed on the same side, while in another embodiment the thumbnail image may be printed on one side and the machine readable information is printed on a second side of the media key. In the physical manifestation, the media key may be a piece of paper, plastic, etc.

Figure 4:
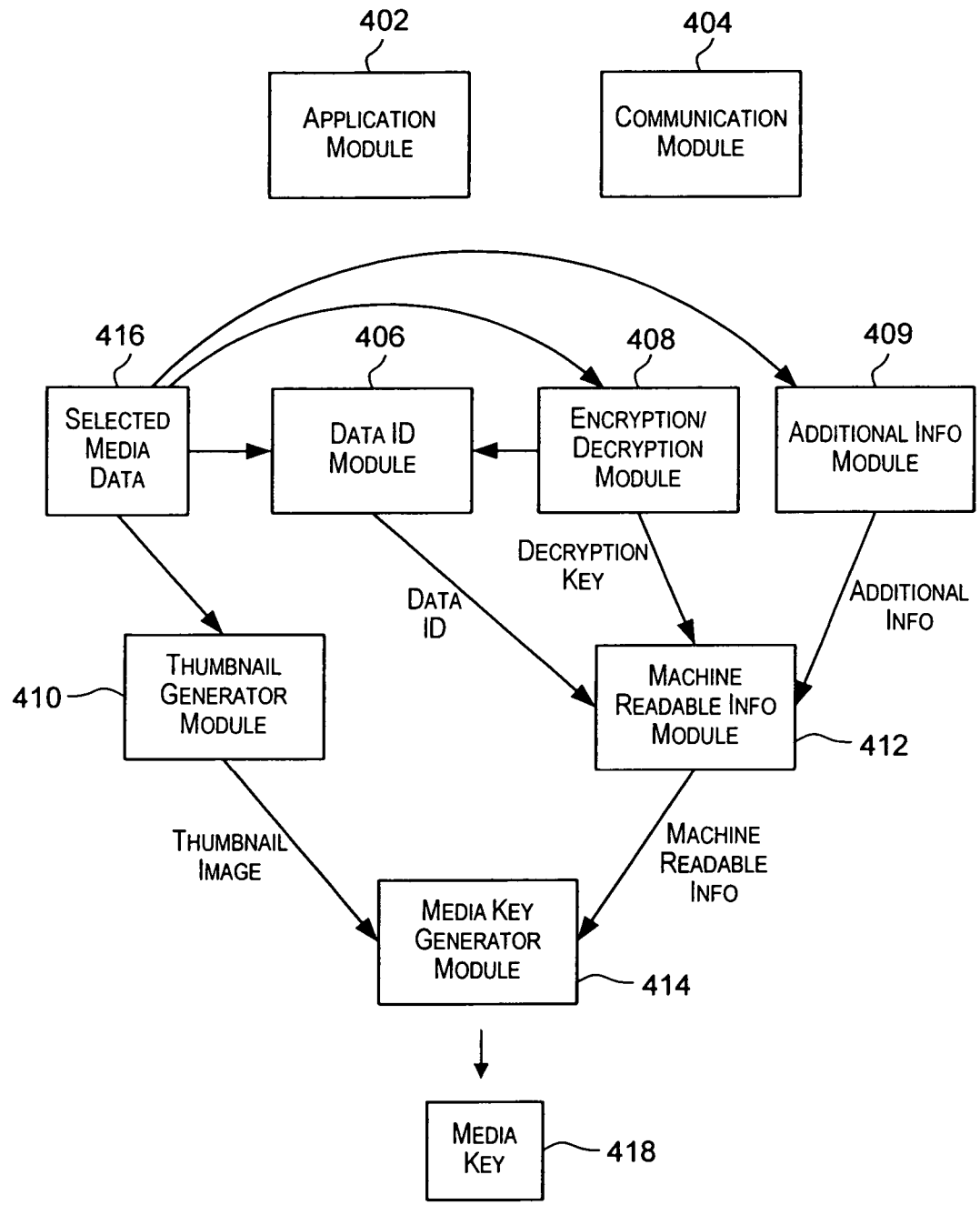
FIG. 4 is a simplified block diagram of modules that may be used to generate a media key according to an embodiment of the present invention.

FIG. 4 is a simplified block diagram of modules that may be used to generate a media key according to an embodiment of the present invention. The modules depicted in FIG. 4 may be implemented in software, or hardware, or combinations thereof. The modules depicted in FIG. 4 include an application module 402, a communication module 404, a data identifier module 406, a decryption/encryption module 408, an additional information module 409, a thumbnail generator module 410, a machine readable information module 412, and a media key generator module 414. The modules depicted in FIG. 4 are merely illustrative of an embodiment of the present invention. Other embodiments may have more or less modules.

Generation of a media key for media data 416 may be facilitated using application module 402. For example, application module 402 may provide interfaces (e.g., GUIs) that enable a user to identify the media data and request generation of a media key for the identified media data.

Status information regarding the media key creation process may be output to the user via the GUIs provided by application module 402.

In other embodiments, a media key may be automatically generated without any user intervention. In one embodiment, application module 402 may be configured to automatically determine when a media key is to be generated. The media data 416 for which a media key is to be generated may also be automatically selected. For example, application module 402 may be configured to initiate generation of a media key in response to one or more events. For example, a media key may be created automatically as a result of an event, such as a phone call where leaving a voice mail triggers the creation of a media key. The voice mail may be automatically selected for generation of the media key.

Application module 402 may also be configured to receive a signal to initiate generation of a media key from a device, apparatus, process, application, or program, etc. For example, the generation of a media key may be triggered in response to a security camera detecting an event and sending a signal to application module 402 to generate a media key. Several other events may also trigger automatic creation of one or more media keys.

Communication module 404 is configured to handle communication functions that are performed during creation of a media key. For example, tasks such as connecting to remote servers across networks, downloading/uploading information from storage, etc. may be facilitated by communication module 404. For example, in FIG. 2, communication module 404 may reside on processing system 202 and handle communication of data to and from processing system 202.

Data identifier module 406 is configured to determine a data identifier for the media data 416 for which a media key is created. If the data identifier is generated by a server or an identifier generation system/service, then data identifier 406 is configured to retrieve or receive the data identifier from that entity. Data identifier module 406 may also generate a data identifier. This may be done based upon media data 416 identified for creation of a media key. For example, data identifier module 406 may be configured to calculate a cryptographic hash (e.g., an MD5 hash) for media data 416. The cryptographic hash is used as the data identifier for the media data. The data identifier may be communicated to machine readable information module 412.

Encryption/decryption module 408 is configured to perform encryption and/or decryption functions during generation of a media key. For example, module 408 may be configured to encrypt the media data. The encrypted data may then be provided to data identifier module 406 for generation of a data identifier based upon the encrypted data. Encryption/decryption module 408 is also configured to determine a decryption key that can be used to decrypt the encrypted media data. In embodiments where a symmetric encryption technique is used to encrypt the data, the decryption key is same as the encryption key. The decryption key may be communicated to machine readable information module 412 for inclusion in the machine readable information. Module 408 may also use the decryption key to decrypt the data.

Additional information module 409 is configured to determined additional information, if any, to be included in the machine readable information. The additional information may be determined based upon media data 416. The additional information may be communicated to machine readable information module 412 for inclusion in the machine readable information.

Thumbnail generator module 410 is configured to generate a thumbnail image for media data 416 for which a media key is generated. Module 410 may be configured to generate a thumbnail image that is representative of the contents of media data 416. The thumbnail image provides a human-readable visual representation indicative of the contents of the media data for which the media key is created. The thumbnail image generated by module 410 is communicated to media key generator module 414.

Machine readable information module 412 is configured to generate machine readable information that includes the data identifier received from data identifier module 406 and optionally the decryption key received from encryption/decryption module 408 and the additional information received from additional information module 409. In one embodiment, machine readable identifier module 412 is configured to generate a machine readable identifier such as barcode (e.g., a QR code) encoding the data identifier and optionally the decryption key and the additional information. In another embodiment, machine readable identifier module 412 may be configured to prepare machine readable information that can be written to a RFID tag attached to a media key.

Media key generator module 414 is configured to generate a media key 418 as a physical object and/or as an electronic object. Module 414 is configured to print the thumbnail image received from thumbnail generator module 410 on media key 418. Module 414 is also configured to associate machine readable information with media key 418. In one embodiment, this is done by printing the machine readable information on media key 418. In an embodiment using an RFID tag, the machine readable information may be written to the RFID tag that is attached (including embedded) to media key 418. Various techniques may be used to attach an RFID tag to a media key. In one embodiment, the RFID tag may be embedded in the media key. The RFID tag may also be attached to the media key using clips, adhesives, etc.

As described above, a media key may be generated automatically or in response to a user request. As part of the media key creation, the media data for which the media key is being generated may be identified by the user or may be automatically identified without any user intervention, for example, upon occurrence of an event (e.g., voice mail being recorded, email received). In alternative embodiments, the media data may be identified using previously generated media keys. Accordingly, a new media key may be generated using previously generated media keys.

Figure 5:
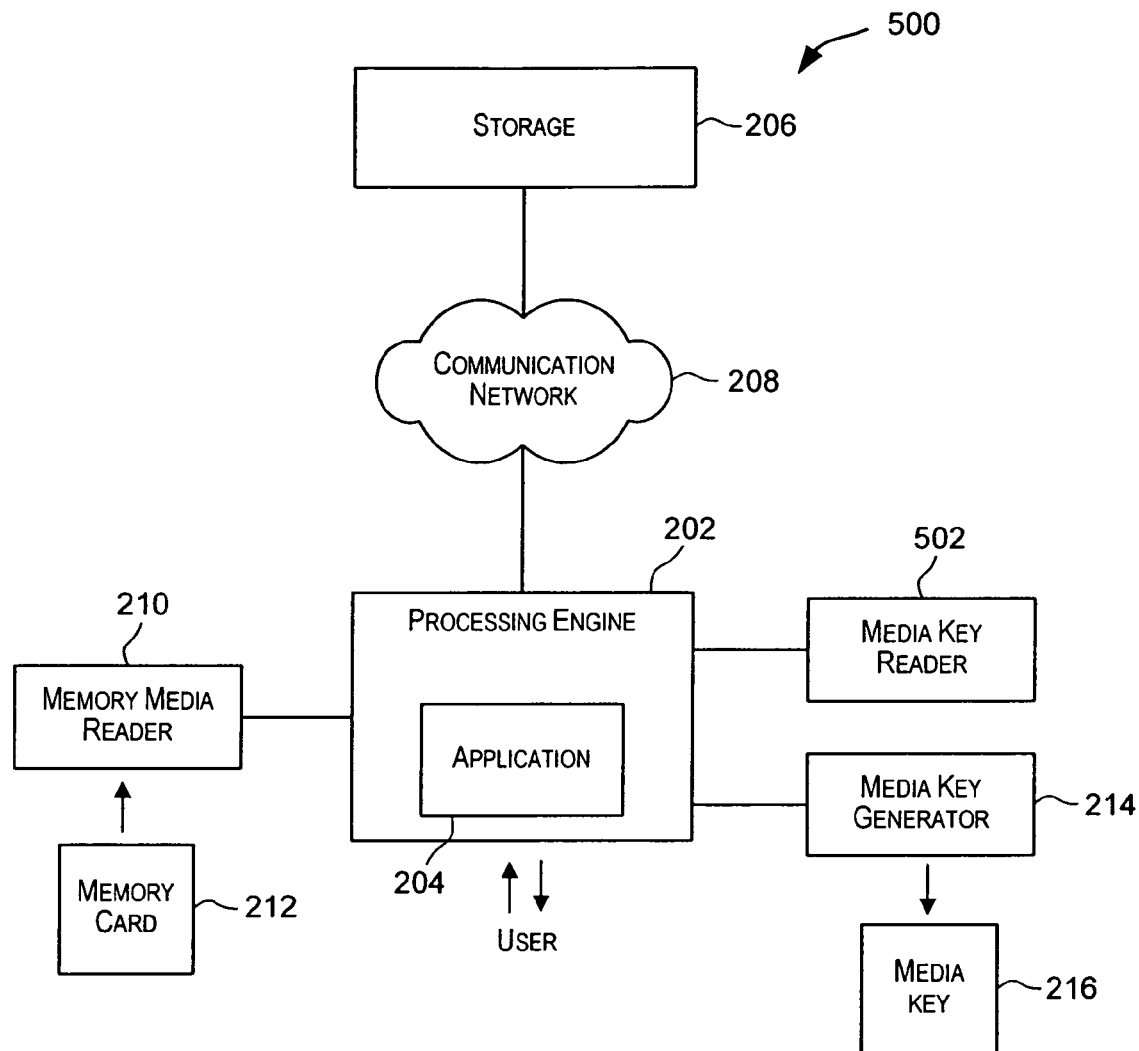
FIG. 5 is a simplified block diagram of a system that may be used to create media keys according to an embodiment of the present invention.

FIG. 5 is a simplified block diagram of a system 500 that may be used to create media keys according to an embodiment of the present invention. System 500 depicted in FIG. 5 is merely illustrative of an embodiment incorporating the present invention and does not limit the scope of the invention as recited in the claims. One of ordinary skill in the art would recognize other variations, modifications, and alternatives.

System 500 depicted in FIG. 5 is quite similar to system 200 depicted in FIG. 2 and like components have been assigned the same reference. In addition to the components depicted in FIG. 2, system 500 comprises a media key reader 502 coupled to processing system 202.

Media key reader 502 is capable of reading machine readable information from one or more media keys. Different techniques may be used to read the machine readable information from a media key including scanning techniques, optical character recognition (OCR) techniques, reading reflected energy (e.g., for a RFID tag), etc. For example, if the machine readable information is encoded as a barcode printed on a media key, media key reader 502 may scan or read the barcode. Media key reader 502 may also be configured to parse the barcode to determine the data identifier and optionally the decryption key and additional information encoded by the barcode. If the machine readable information is stored in an RFID tag attached to the media key, then media key reader 502 may read the information from the RFID tag, the information comprising the data identifier for the media data corresponding to the media key, possibly a decryption key, and possibly additional information. Media key reader 502 may send an interrogation signal to the RFID tag and receive the machine readable information in response from the tag.

Media key reader 502 may be of different kinds including but not restricted to a barcode reader, an RFID reader, a camera (video camera, webcam, digital camera, etc.), a scanner, a tablet reader, a magnetic stripe reader, or other like device capable of capturing machine readable information from a media key.

A collection of one or more previously generated media keys (e.g., a stack of media keys) may be presented to media key reader 502 and application 204 may be requested to generate a media key based upon the presented collection of media keys. In this context, presentation of a previously created media key to media key reader 502 indicates to application 204 that the media data corresponding to the presented media key is to be included in the media data for which a new media key is being generated. In this manner, presenting a collection of media keys to media key reader 502 indicates that a new media key is to be created for media data that comprises a collection of media data that includes media data corresponding to each media key in the collection of media keys.

Responsive to the request to create a media key based upon a set of previously created media keys, processing engine 204 may cause media key reader 502 to read the machine readable information from each media key in the collection of media keys presented to the reader. Media key reader 502 may forward the machine readable information read from each media key in the collection to processing system 202 for further processing. For each media key in the collection, processing system 202 may then parse the machine readable information received from media key reader 502 to determine the data identifier, and possibly the decryption key and additional information included in the machine readable information for the media key. For each media key, processing engine 204 may then access the media data corresponding to the media key by using the data identifier determined for the media key. The decryption key, if any, read from a media key may be used to decrypt the data corresponding to the media key.

The media data for the new media key to be created includes the media data corresponding to each media key in the collection of media keys. Accordingly, the media data for the new media key represents a collection of media data corresponding to the media keys in the collection of media keys presented by the user. For example, if the collection comprises two media keys, a first media key corresponding to a first media item and a second media key corresponding to a second media item, then the media data corresponding to the new media key being generated using the first and second media key comprises the first media item and the second media item. The first and second media items may be stored in different memory locations and need not be contiguous.

Processing engine 202 is configured to determine a data identifier for the collection of media data. The data identifier may be used to access the media items included in the collection of media data for the new media key being generated. In one embodiment, the data identifier points to a list of data identifiers read from the machine readable information from the collection of media keys. For each data identifier corresponding to a media key in the collection, the list may also comprise information identifying a decryption key read from the machine readable information for the media key. In one embodiment, a cryptographic hash is calculated for the list information used as the data identifier for the new media key. The data identifier generated in this manner may be used to access the list. The data identifiers in the list may subsequently be used to locate and access the individual media items in the collection of media data for the new media key. A data identifier in the list may in turn point to another list and so on.

Processing engine 202 may also determine a decryption key and additional information for the collection of media data. In one embodiment, the list information is encrypted and the decryption key represents a key that can be used to decrypt the encrypted list information. The data identifier, decryption key, and additional information is then converted to machine readable information.

A thumbnail image may also be created that is representative of the collection. For example, if each media key in the collection of media keys presented to the reader corresponds to a photo, then the media data for the new media key includes a collection of photos. The thumbnail image that is thus generated fro a collection of photos. The thumbnail image for this media key may depict a collection of photos.

A new media key (either as a physical object or an electronic object) may then be generated using the machine readable information and the thumbnail image. The thumbnail image may be printed on the new media key and the machine readable information may be associated with the media key. The media data corresponding to the new media key corresponds to the collection of media data and may include a number of media items. The newly created media key may be used to locate and access the collection of media data, as described below in further detail.

As described above, a user can identify media information for which a media key is to be created using one or more previously created media keys. Combinations of the aforementioned techniques may also be used for creating a media key. For example, a user may specifically identify some media items and also present a collection of keys and request generation of a new media key. It should be noted that the collection of keys presented by the user may also include a media key that itself corresponds to a collection of media items. Accordingly, collections may be created using other collections.

Figure 6:
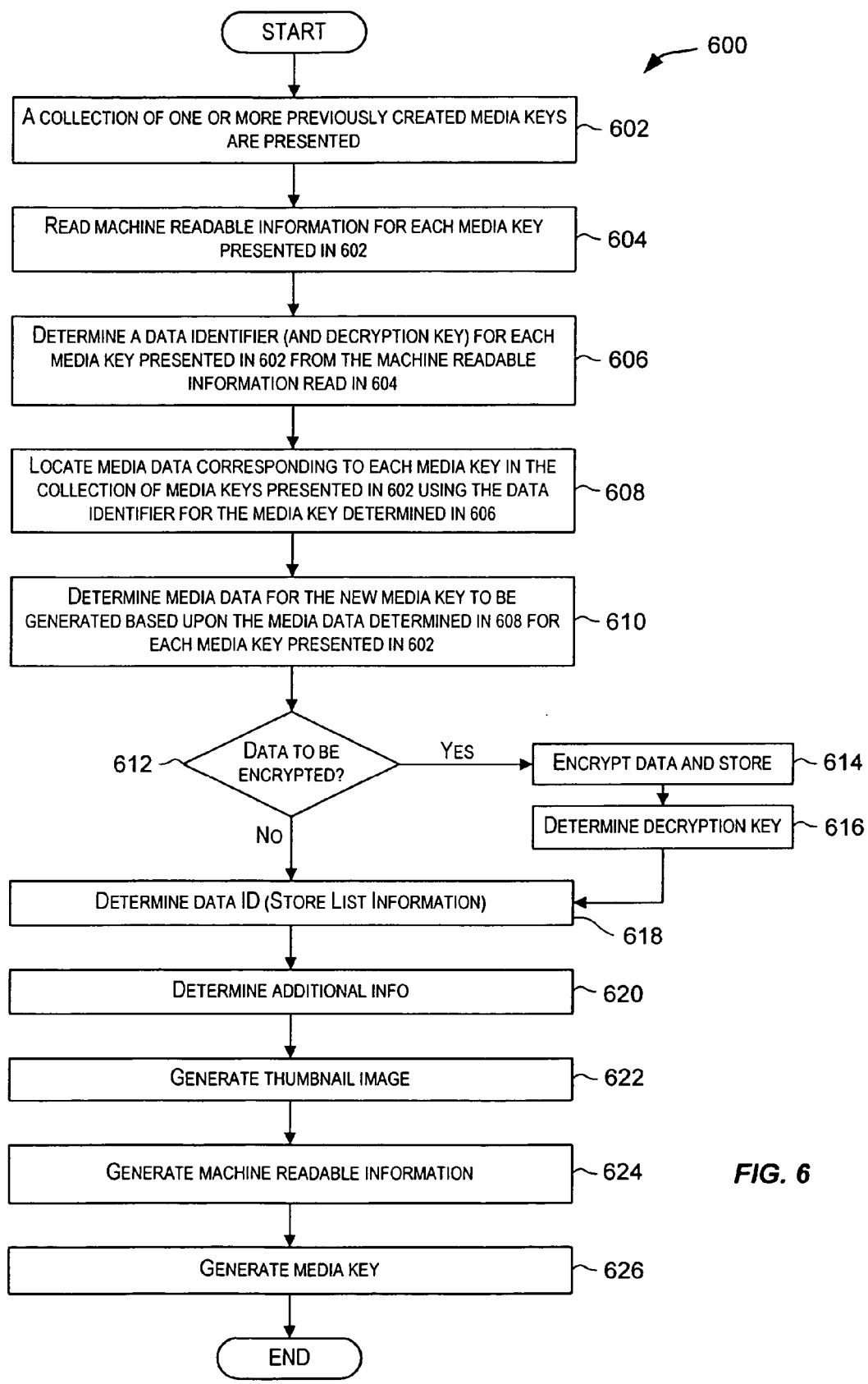
FIG. 6 is a simplified high-level flowchart depicting processing for generating a media key using previously generated media keys according to an embodiment of the present invention.

FIG. 6 is a simplified high-level flowchart 600 depicting processing for generating a media key using previously generated media keys according to an embodiment of the present invention. The processing may be performed by software modules (code, instructions), hardware modules, or combinations thereof. Flowchart 600 depicted in FIG. 6 is merely illustrative of an embodiment of the present invention and is not intended to limit the scope of the present invention. Other variations, modifications, and alternatives are also within the scope of the present invention.

As depicted in FIG. 6, a collection of one or more previously created media keys are presented (step 602). The media keys may be presented to one or more media key readers. The machine readable information for each media key presented in 602 is then read (604). Different types of media key readers may be used to read the machine readable information and the information may be read in different ways. In one embodiment, a media key reader may be able to read machine readable identifier information for only a single media key at a time. In such an embodiment, a user may present each media key in the collection to the media key reader in a serialized manner. In other embodiments, a media key reader may be able to process multiple media keys at a time. For example, a tablet reader may be used where the user may place the collection of media keys on a glass platen of a tablet reader and the reader is able to scan and read the machine readable information for all the media keys placed on the platen.

Figure 7:
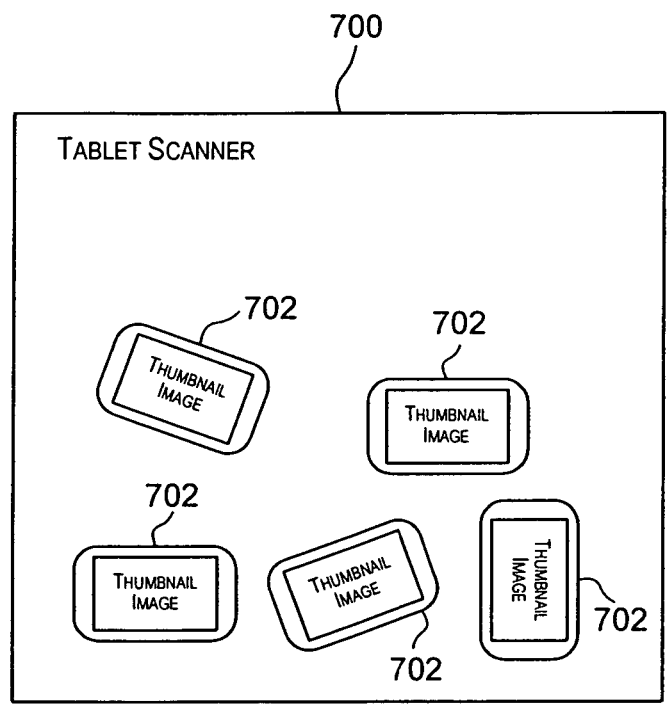
FIG. 7 depicts an example of a tablet reader that is configured to process multiple media keys according to an embodiment of the present invention.

FIG. 7 depicts an example of a tablet reader 700 that is configured to process multiple media keys according to an embodiment of the present invention. As depicted in FIG. 7, the user may place a collection of physical media keys 702 on the scanning surface or glass platen of the tablet reader. Media keys 702 may be such that the thumbnail image for each media key is printed on the top side of the media key (and is thus visible as depicted in FIG. 7) and the machine readable information for each media key is printed on the bottom side of the media key facing the scanner (and is thus not visible in FIG. 7). In alternative embodiments, the machine readable information and the thumbnail may be printed on the same side of a media key. In yet other embodiments, some of the media keys in the collection may have the thumbnail image and machine readable information on the same side while other media keys in the collection may have the thumbnail image and machine readable information on different sides.

Tablet reader 700 is then configured to scan the media keys 702 and read the machine readable information from each media key placed on the reader. In one embodiment, reader 700 may read and scan the different media keys in a particular order, for example, from top to bottom and left to right. Thus, the media keys may be scanned in a particular order based upon the positions of the media keys on the tablet reader scanning surface. This scanning order may be used to associate an ordering for the media keys in the collection. This ordering may then be used for subsequent processing, as described below. In other embodiments, tablet reader 700 may be configured to capture an image of the media keys and the image may then be analyzed to determine machine readable information for individual media keys.

In alternative embodiments, other criteria may be used to determine ordering for the collection of media keys. For example, in one embodiment, ordering may be determined based upon the temporal order in which the media keys from the collection are presented to a media key reader. Ordering may also be determined based upon the type (e.g., audio, photo, video, etc.) and/or contents of the media data or items corresponding to the media keys in the collection. For example, a media key corresponding to photos may be placed higher in the ordering than a media key corresponding to audio data. Information regarding the ordering may be preserved for later use. For example, in one embodiment, the ordering information is stored in the additional information for the newly generated media key.

A data identifier is then determined for each media key presented in 602 from the machine readable identifier information read from the media key in 604 (step 606). If applicable, a decryption key is also determined for each media key presented in 602 from the machine readable information. Additional information may also optionally be determined for each media key presented in 602 from the machine readable information.

Media data corresponding to each media key in the collection of media keys presented in 602 is then located using the data identifier determined for the media key in 606 (step 608). As part of 608, if the media data for a media key is encrypted, then the decryption key determined for the media key may be used to decrypt the data.

Media data for the new media key to be generated is determined based upon the media data determined in 608 for each media key presented in 602 (step 610). The media data for the new media key is a collection of the media data for the individual media keys in the collection of media keys. This collection of media data may comprise one or more media items. The media items in the collection may be stored in different memory locations and need not be stored contiguously.

As previously described, an ordering may be determined for the media keys in the collection of media keys. For example, as previously described, the ordering may correspond to the order in which the media keys are read, the position of the media keys, the type of data corresponding to the media keys, etc. This ordering determined for the collection of media keys may be used to assign an ordering to the media data items in the collection of media data for the new media key to be generated. This ordering may be subsequently be used to determine the order in which the media items in the collection of media data are processed or output using the new media key being generated. The ordering information may be stored in the additional information for the new media key.

A determination is then made if the media data for the key being generated is to be encrypted (step 612). If the data is to be encrypted, then the data is encrypted (step 614). As part of 614, the encrypted data may be uploaded and stored in a storage location. In some embodiments, the media data may be uploaded after determination of the data identifier such that the data identifier may be used to access the media data. A decryption key that enables decryption of the encrypted data is then determined (step 616). If a symmetric encryption technique is used to encrypt the data then the decryption key is same as the encryption key that is used to encrypt the data.

A data identifier is then determined for the media data determined in 610 (step 618). Different techniques may be used to generate the data identifier. If the data is encrypted, then the data identifier is determined based upon the encrypted data.

As previously described, in some embodiments, a list is stored comprising the data identifiers determined in 606 for the collection of media keys that are presented. Such a list may be generated in step 618 or in prior step after reading the data identifiers for the collection of media keys. A data identifier in the list may in turn refer to another list of data identifiers. If the media data (determined in 608) corresponding to a data identifier in the list is encrypted, then the decryption key for decrypting the data determined in 606 is associated with the data identifier and also stored as part of the list.

In one embodiment, the data identifier determined in 618 points to the list information. The data identifier in 618 may be a cryptographic hash calculated for the list.

Accordingly, the data identifier generated in 618 for the new media key may point to a list comprising a collection of data identifiers and associated decryption keys, if applicable, read from the media keys in the collections of media keys. This list may subsequently be used to locate and access the collection of media data corresponding to the new media key.

Additional information, if any, to be included in the machine readable information for the media key is then determined (step 620). In one embodiment, the ordering information determined for the collection of media keys may be included in the additional information for the new media key being generated. In some embodiments, the list information may also be stored as part of the additional information for the media key being generated.

A thumbnail image is generated that is representative of the contents of the media data for the new media key (step 622). The thumbnail image may be created such that it provides a human-readable visual indication of the contents of the collection of media data. The collection may comprise multiple media items and the thumbnail image may be representative of these media items. In this manner, the thumbnail image provides a visual cue to the user as to the contents of the media data corresponding to the media key being created.

Machine readable information is then generated for the media key to be generated (step 624). The machine readable information may include the data identifier generated in 618 and optionally a decryption key determined/generated in 616 and the additional information determined in step 620.

A new media key (either as a physical object or an electronic object) is then created using the thumbnail generated in 622 and the machine readable information generated in 624 (step 626). The thumbnail image is printed on the new media key and the machine readable information is associated with the media key. The newly created media key corresponds to media data that includes a collection of media data corresponding to the media keys presented in 602. The media data corresponding to the newly generated media key may include a number of media items. The newly created media key may then be used to access the corresponding media data.

Using Media Keys

Figure 8:
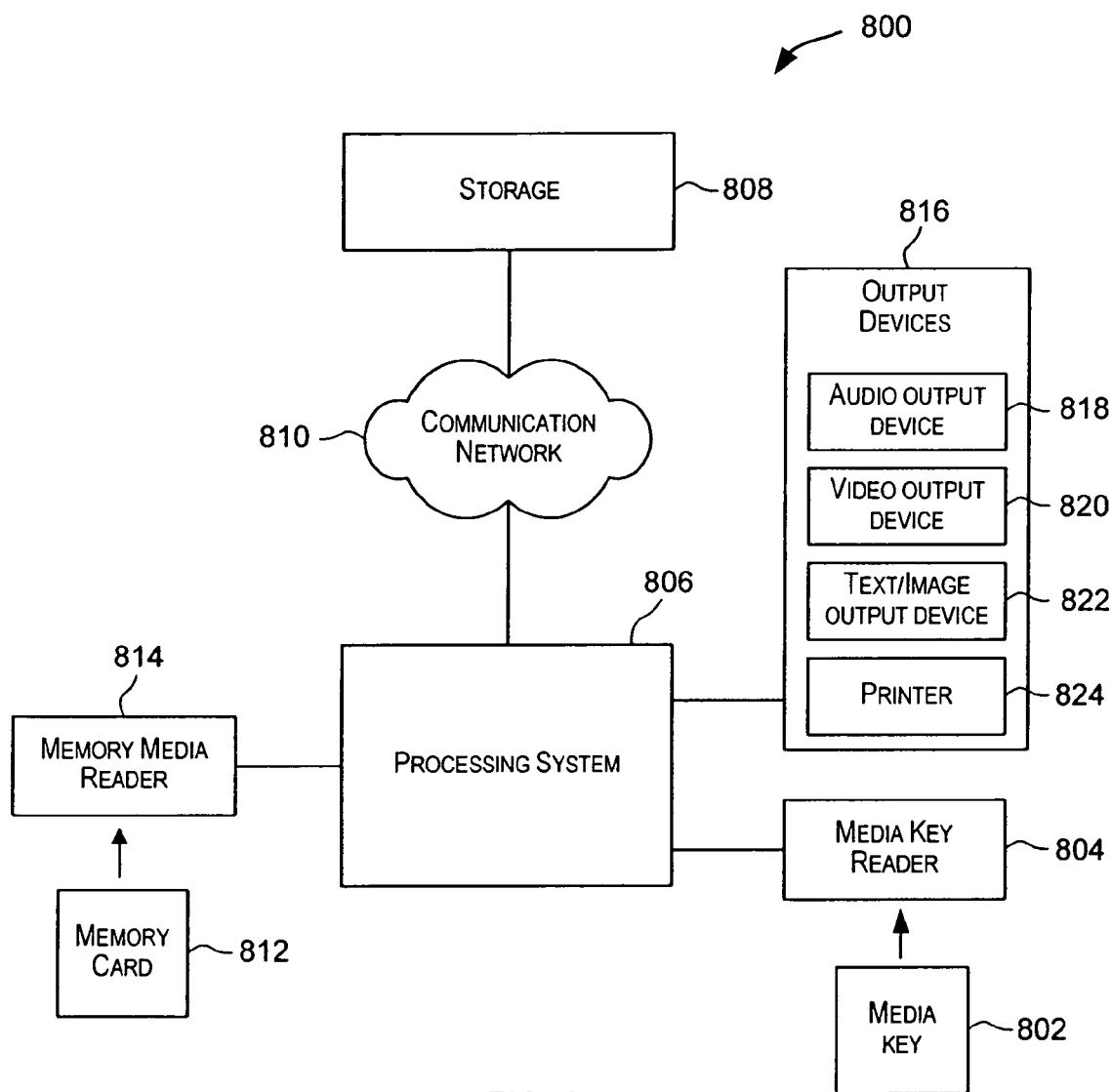
FIG. 8 is a simplified block diagram of a system that enables a user to use a media key to access media data corresponding to a media key according to an embodiment of the present invention.

A media key may be used in various different ways. In one embodiment, a user may use a media key to access media data corresponding to the media key. FIG. 8 is a simplified block diagram of a system 800 that enables a user to use a media key to access media data corresponding to a media key according to an embodiment of the present invention. System 800 depicted in FIG. 8 is merely illustrative of an embodiment incorporating the present invention and does not limit the scope of the invention as recited in the claims. One of ordinary skill in the art would recognize other variations, modifications, and alternatives.

As depicted in FIG. 8, a user may present a media key 802 to a media key reader 804. Media key reader 804 is configured to read the machine readable information from media key 802. As previously described, various different types of media key readers may be used. Examples include but are not restricted to a barcode reader, an RFID reader, a magnetic stripe reader, a camera (video camera, webcam, etc.), scanner, a tablet reader, or other like device capable of capturing machine readable identifier information from a media key. For example, if the machine readable information on a media key is encoded in a machine readable identifier such as a barcode, media key reader 804 is configured to scan or read the barcode. If an RFID tag is used, media key reader 802 is configured to read the machine readable information from the RFID tag.

Information read by media key reader 804 may be communicated to processing system 806. Processing system 806 may be a data processor comprising a processor and a memory subsystem. Processing system 806 is configured to parse the machine readable information received from media key reader 802 and determine a data identifier from the information. Processing system 806 may optionally also determine a decryption key and additional information from the information received from media key reader 802.

Using the data identifier, processing system 806 is configured to access the media data corresponding to the data identifier. The media data may be stored locally or remotely from processing system 806. For example, the media data corresponding to the data identifier may be stored by a server in storage 808 that may be coupled to processing system 806 via communication network 810. Processing system 806 is configured to find the server storing the media data and also locate the media data on the server using the data identifier determined from the media key. In some embodiments, a default storage location may be specified and the data identifier may be used to identify a particular file at the default storage location.

In some embodiments, in addition to the data identifier, additional information determined from the machine readable identifier may also be used to locate the media data corresponding to the media key. For example, the additional information may identify the storage location of the media data and the data identifier may then be used to find the particular file storing the media data. It should be noted that the media data corresponding to a media key need not all be stored in one storage location. The media data need not be contiguously stored and may be distributed among multiple storage locations and processing system 806 is configured to determine these storage locations.

The media data corresponding to the data identifier may also be stored by processing system 806. Alternatively, the data may be stored on removable memory media 812 such as a memory card, disk, etc. A memory media reader 814 is provided coupled to processing system 806 to accept the memory media and read data corresponding to the data identifier from the memory media.

In some instances, the media data that is accessed using the data identifier may be in encrypted form. In such instances, processing system 806 may use the decryption key determined from the machine readable information for the media key to decrypt the media data.

Various actions or operations may be performed on the media data accessed for the media key. Processing system 806 may cause the decrypted information determined for the media key to be output via one or more output devices 816. Output devices 816 may comprise one or more audio output devices 818 (e.g., speakers), video output devices 820 (e.g., a monitor, screen, projector), text/image output devices (e.g., a screen, monitor, projector), a printer 824, and other devices that may be used to output information. For example, if the media data determined for the media key includes audio information, then the information may be output using audio output devices 818. If the media data determined for the media key includes video information (e.g., movie clips), then the information may be output using video output devices 820. If the media data determined for the media key includes text or images, then the information may be output using devices 822 or 824.

Printer 824 may provide print outs of the information included in the media data determined for the media key. For example, if the media data comprises digital photos, then the photos may be printed using printer 824. Printer 824 may also be configured to print a printable representation of other types of media information (e.g., a transcription of audio information, print key frames from video information, etc.). An example of printing media data on a paper medium is described in U.S. application Ser. No. 10/001,895 filed Nov.

19, 2001 assigned to the same assignee as the present application and titled "Paper-Based Interface For Multimedia Information", the entire contents of which are incorporated herein by reference for all purposes.

The media data determined for a media key may comprise different types of information (i.e., multi-channel data) and different output systems may be used to output the data. For example, the media data for a media key may comprises a set of photos and also audio information. In this example, the photos may be displayed on the screen and the audio information may be output via speakers while the photos are being displayed.

In one embodiment, if the media data determined for the media key comprises multiple media items, then the media items may be processed or output in a particular order. The order of output may be specified in the additional information determined from the media key. Alternatively, processing system 806 may determine an order based upon the type of media items. In yet other embodiments, the order may have been set when the media key was created (as previously described). For example, if the media data determined for the media key comprises a set of photos or slides and an audio clip, then the slides may be output sequentially per a predetermined order on a screen and the audio clip may be simultaneously output via speaker, thus resulting in a photo/slide show accompanied by music.

Various other operations may be performed using the media data determined for the media key. In one embodiment, the actions or operations to be performed may be specified in the additional information determined for the media key. The additional information may also identify an application to be invoked for performing the operations. In other embodiments, a default operation may be specified by the user. Processing system 806 may cause these operations to be performed.

In a preferred embodiment, a special class of media keys may be created to specify the operations to be performed. These media keys may be referred to as "action media keys" since they are used to identify an action to be performed. In one embodiment, the data identifier read from an action media key may be used to access information that identifies an action to be performed. In another embodiment, the action to be performed may be stored in the additional information stored in the machine readable information for the action media key.

An action media key may be presented to a media card reader along with a set of one or more media keys that correspond to media data. In response, the action corresponding to the action media key may be performed on the media data retrieved corresponding to the set of media keys.

Action media keys may be generated for various different actions such as communicating the media data (or a portion thereof) to a recipient, faxing the media data, printing the media data, translating the media data, changing the format of the media data, translating the media data, etc. For example, an action media key may correspond to an email operation. When this action media key is presented with a media key corresponding to media data, the media data is emailed to some recipient. The recipient may be identified in the additional information in the action media key. Alternatively, a separate media key may be created to identify the recipient or any user. For example, a media key may be generated where the data identifier read from the media key may be used to access data that identifies a recipient. In alternative embodiments, the recipient may also be identified by the additional information stored in the machine readable information for a media key.

A user may also specify the operations to be performed on media data accessed for a media key. For example, a system configured to process media keys may provide various user-selectable options (e.g., buttons, menus, etc.) that allow a user to specify the action to be performed for media data accessed for a media key. Default actions may also be specified. Different default operations may be specified for different types of data.

Figure 9:
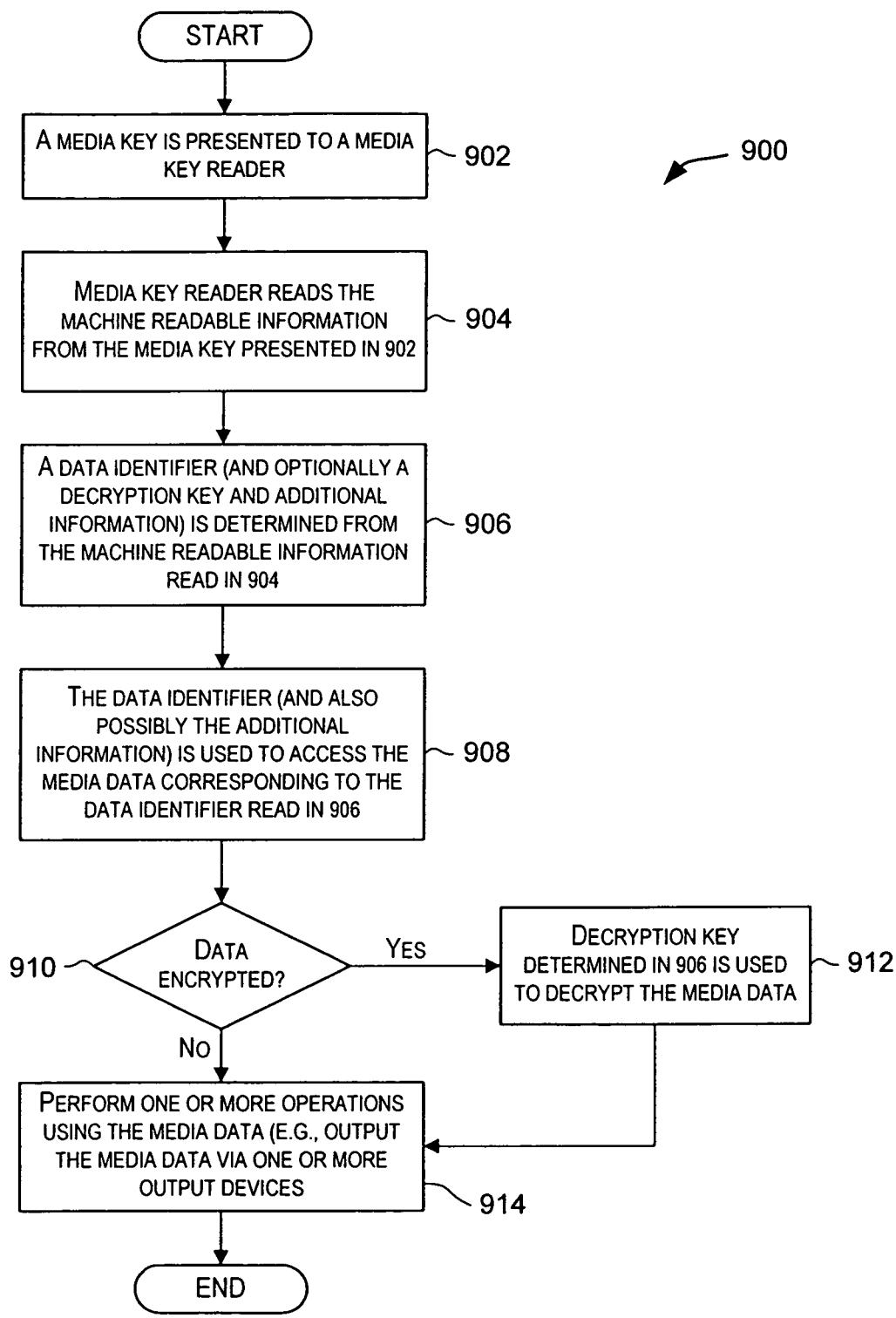
FIG. 9 is a simplified high-level flowchart depicting processing performed for using a media key according to an embodiment of the present invention.

FIG. 9 is a simplified high-level flowchart 900 depicting processing performed for using a media key according to an embodiment of the present invention. The processing may be performed by software modules (code, instructions), hardware modules, or combinations thereof. Flowchart 900 depicted in FIG. 9 is merely illustrative of an embodiment of the present invention and is not intended to limit the scope of the present invention. Other variations, modifications, and alternatives are also within the scope of the present invention.

Processing may be initiated when a media key is presented to a media key reader (step 902). The media key reader reads the machine readable information from the media key presented in 902 (step 904). The machine readable information may then be communicated to a data processing system for further processing.

A data identifier and optionally a decryption key and additional information are determined from the machine readable information read in 904 (step 906). The data identifier is then used to locate and access the media data corresponding to the data identifier (step 908). The data identifier may identify the storage location of the data. In some embodiments, additional information for the media key may also be used to locate the media data corresponding to the media key. There are a variety of ways of accessing the media data (either encrypted or unencrypted) using a data identifier. The data identifiers that are generated for the media keys are preferably unique. In one embodiment, a web server may be provided that is configured to retrieve and respond with the media data when provided a specific data identifier. An example of such a web server is the Flickr website (http://www.flickr.com) which provides access to individual images if the image identifier (ID) is specified. For instance, an identifier such as "http://static.flickr.com/23/41302953_d1aa3c791d.jpg" points to an image where "23/41302953_d1aa3c791d.jpg" is the name of the image or the media identifier. Accordingly, image media data may be uploaded to the Flickr server which generates an identifier (e.g., 23/41302953_d1aa3c791d.jpg) that points to the image and would be the same as the Flickr name. Then, every application that reads those media keys would prepend "http://static.flickr.com/" to the data identifier in order to access that image through the web. Other techniques may also be used to access media data based upon a data identifier.

A check is then made to determine if the data accessed in 906 is encrypted (step 910). In one embodiment, this check may be done by determining if the machine readable information read in 904 comprises a decryption key, the presence of which indicates that the accessed data is encrypted. If the data is encrypted, then the decryption key determined in 906 is used to decrypt the media data (step 912).

One or more operations or actions may be performed using the decrypted media data or a portion thereof (step 914). The operations may include outputting the media data via one or more output devices, communicating the media data, etc.

The media data retrieved for the media key may comprise data of one or more types or one or more media items. In instances where the retrieved media data comprises multiple types of data or multiple media items, an order may be determined for outputting the information. Various techniques may be used for determining the output order. In one embodiment, the information may be output in a random manner. In another embodiment, the various types of information may be output at the same time. In yet another embodiment, the additional information determined from the machine readable information for the media key may specify an order. In yet another embodiment, the type of media data or media item or the channels of the media data may be used to determine the order of output. For example, photos and audio information may output simultaneously and video information may be output last, etc. In yet other embodiments, the user may be allowed to select the order in which the information is output.

A user may present multiple keys to a media key reader. For example, as shown in FIG. 7, multiple keys may be presented to a tablet reader. The processing depicted in FIG. 9 and described above may then be applied to each media key that is presented to the media key reader. For example, if a collection of media keys are presented, then media data may be located for each media key in the collection and then one or more operations or actions may be performed on the media data retrieved for the collection.

In instances where multiple keys are presented to the media key reader, the order in which the media data for each media key is processed or output may be determined in various ways. In one embodiment, the media data for the keys may be randomly output. In another embodiment, the various types of information may be output at the same time. In another embodiment, the order in which the media keys are read may determine the order in which the media data is output. For example, if a first media key is read before a second media key, then the media data corresponding to the first media key will be output before the media data corresponding to the second media key. The type of media data or the channels of the media data may be used to determine the order of output. For example, photos and audio information may output simultaneously and video information may be output last, etc.

In yet other embodiments, the user may be allowed to specify the order in which the media data accessed for multiple media keys is to be output. For example, in an embodiment where a tablet reader is configured to read media keys placed on the table scanner in a particular order (e.g., left to right and top to bottom), the user may place the media keys in a particular layout to specify an order which is then used to output the information.

Various different techniques may be used to indicate the action or operation to be performed on media data located for a media key. In one embodiment, a user may be allowed to specify the action to be performed via a user interface. In another embodiment, the action to be performed may be determined based upon the type of media data corresponding to a media key. In other embodiments, a default action (e.g., an output action) may be configured. In yet other embodiments, the presence of action media keys may be detected and the actions corresponding to the action media keys may be performed.

Figure 10:
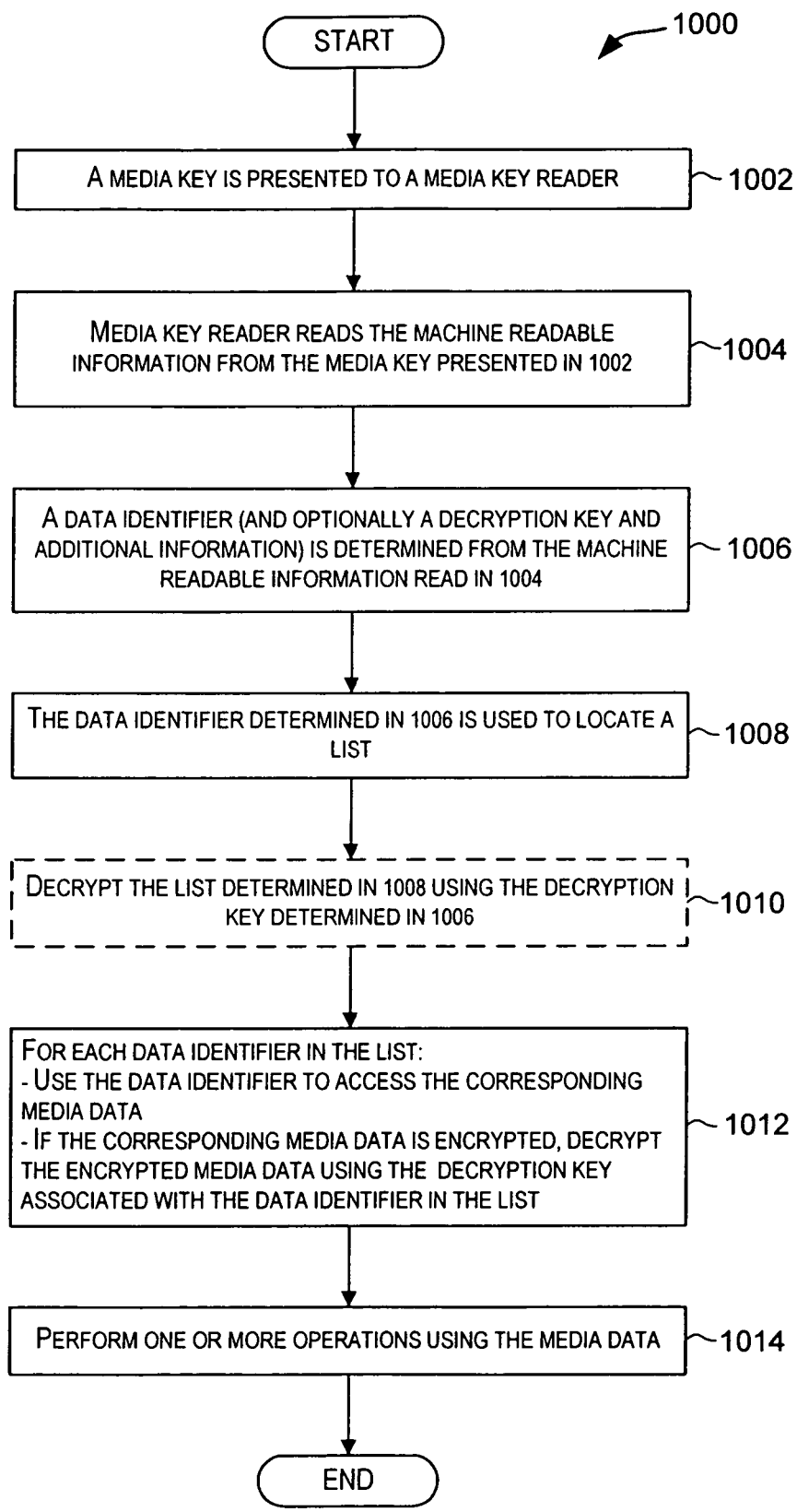
FIG. 10 is a simplified high-level flowchart depicting processing performed for using a media key corresponding to a collection of media data according to an embodiment of the present invention.

As previously described, a media key may correspond to a collection of media data. For example, as previously described, a media key created using other previously created media keys corresponds to a collection of media data corresponding to the previously created media keys. FIG. 10 is a simplified high-level flowchart 1000 depicting processing performed for using a media key corresponding to a collection of media data according to an embodiment of the present invention. The processing may be performed by software modules (code, instructions), hardware modules, or combinations thereof. Flowchart 1000 depicted in FIG. 10 is merely illustrative of an embodiment of the present invention and is not intended to limit the scope of the present invention. Other variations, modifications, and alternatives are also within the scope of the present invention.

The processing performed in steps 1002, 1004, and 1006 is quite similar to steps 902, 904, and 906 respectively of flowchart 900 depicted in FIG. 9. The data identifier determined in 1006 is used to locate a list of information (step 1008). If the list is encrypted, then the decryption key determined in 1006 is used to decrypt the list (step 1010).

The list may comprise a collection of data identifiers. Each data identifier in the list may have a decryption key, if applicable, associated with it. For each data identifier in the list, the data identifier is used to access media data corresponding to the data identifier (step 1012). If the media data located for the data identifier is encrypted, then the decryption key associated with the data identifier in the list is used to decrypt the media data (step 1012). In this manner, media data is located for each data identifier in the list and decrypted where necessary. It should be noted that a data identifier in the list may in turn point or refer to another list and so on. Accordingly, one or more lists may be traversed in order to locate media data.

One or more operations may then be performed using the media data accessed for the data identifiers in the list (step 1014). For example, the collection of media data may be output. The information may be output in a particular order.

Figure 11:
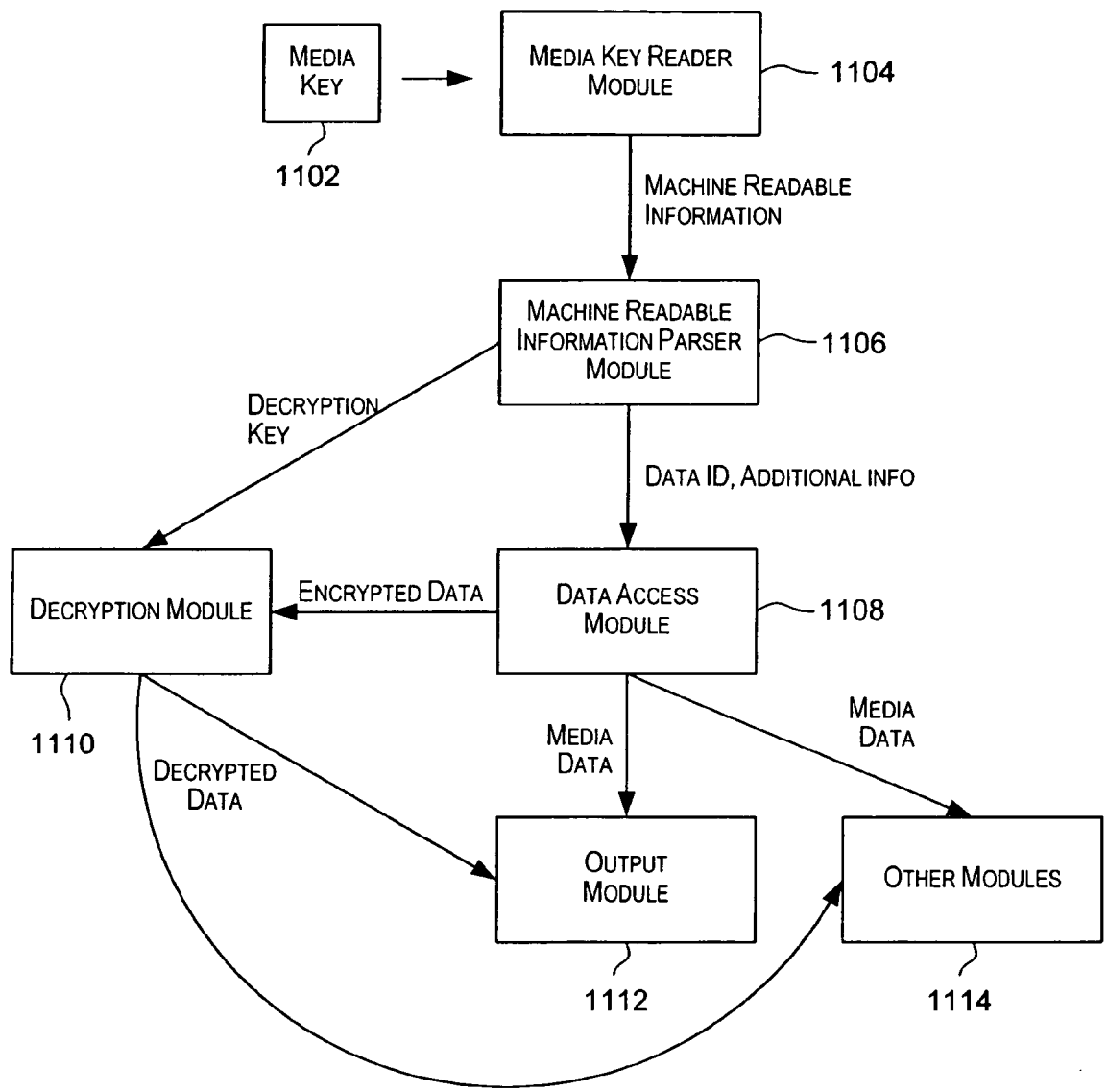
FIG. 11 is a simplified block diagram of modules that may be used to generate output media data for a media key according to an embodiment of the present invention.

FIG. 11 is a simplified block diagram of modules that may be used to access and perform one or more operations on media data for a media key according to an embodiment of the present invention. The modules depicted in FIG. 11 may be implemented in software, or hardware, or combinations thereof. The modules depicted in FIG. 11 include a media key reader module 1104, a machine readable information parser module 1106, a data access module 1108, a decryption module 1110, an output module 1112, and other modules 1114 configured to performs operations using the media data. The modules depicted in FIG. 11 are merely illustrative of an embodiment of the present invention. Other embodiments may have more or less modules.

Media key reader module 1104 is configured to read machine readable information from a media key 1102. The machine readable information is communicated to machine readable information parser module 1106.

Machine readable information parser module 1106 is configured to parse the machine readable information to determine a data identifier from the machine readable information. Machine readable information parser module 1106 may also determine a decryption key and additional information from the machine readable information. The data identifier and additional information may be communicated to data access module 1108. The decryption key may be communicated to decryption module 1110.

Data access module 1108 is configured to access media data corresponding to a data identifier. In one embodiment, given a data identifier, module 1108 is configured to determine the location of media data corresponding to the data identifier and retrieve the media data. The accessed data may be communicated to output module 1110 and/or modules 1112. If the accessed data is encrypted, then the encrypted media data may be communicated to decryption module 1110.

Decryption module 1110 is configured to decrypt encrypted media data using the decryption key received from machine readable information parser module 1106. The decrypted data may then be communicated to output module 1112 and/or to other modules 1114.

Output module 1110 is configured to output the media data using one or more output devices. Output module 1110 may also determine the order in which information is to be output. Modules 1112 may be configured to perform one or more operations using the media data determined for a media key. Modules 1112 may invoke various different applications in the performance of the operations.

As described above, a media key serves as a token that may be used by a user to access and perform operations on media data for which the media key is created. A media key may be passed from one user to another thereby providing a mechanism for distributing and sharing media data.

When generated as a physical object, a media key provides a tangible artifact and tool that provides a convenient and easy interface for accessing media data. A media key thus may be used as a replacement for bulky DVDs and CDs, allowing the original media to be stored and protected while providing a simpler, more compact mechanism for accessing, distributing, and sharing media data. The media keys may be made of inexpensive material thereby providing an inexpensive mechanism for providing access to media data. The media keys are robust and durable and may take less space than the equivalent photographs, video tapes, DVDs, CDs, etc. In many instances, the media keys may be stepped on and washed with no adverse effects.

Various devices and applications may be configured to generate and use media keys. These applications or devices may be configured to generate a media key either under user control or automatically. For example, any device that can access or store media information may be configured to generate one or more media keys for the media information. The devices and/or applications may also be configured to read media keys and perform one or more operations on the media data retrieved for the media keys.

An example of one such device is a digital video recorder (DVR). Recent years have seen a rapid increase in the use of DVRs, especially for recording television programs. An example of such a system is TiVo™. A DVR may be configured to automatically generate media keys for the recorded programs. For example, a TiVo™ DVR may be configured to generate media keys for the recorded television programs. A user may then use the media keys to view the programs.

A DVR may also be configured to read a media key, retrieve media data corresponding to the media key, and output or perform other operations on the retrieved media data. For example, a DVR may comprise a RFID reader that is configured to read machine readable information from an RFID tag attached to a media key when the media key is within reading distance range of the reader. The DVR may then use the data identifier read from the tag to access media data and then output the media data via an output device. A user may thus place a media key corresponding to a program that the user wishes to see within proximity of the DVR, and the DVR is configured to automatically start playback of the program. This simplifies the interface for using a DVR to playback information. In alternative embodiments, a DVR may comprise a barcode reader configured to read barcodes from media keys. The DVR may be configured to perform other operations on the media data, such as communicate (e.g., email) the media data to a recipient, upload the media data to some storage location, etc.

As described above for a DVR, other information output devices (e.g., audio output devices) may also be configured to read and process media keys and output information corresponding to the media keys. For example, a MP3 player may be equipped with an RFID reader (or a barcode reader) and may be configured to read machine readable information from the RFID tag attached to a media key placed within the vicinity of the MP3 player. The MP3 player may then retrieve media data for the media key comprising audio information and output the audio information. Using such an MP3 player, the user merely has to place a media key corresponding to a song that the user wants to hear near the MP3 player and the song is automatically played by the MP3 player.

As another example, information capture devices such as cameras (including digital cameras, video cameras, webcams, etc.) may be configured to generate media keys for the captured information. For example, a digital camera may be configured to generate a media key for a set of photos or for individual photos captured using the camera. For example, the camera may comprise a printer module that is capable of printing media keys.

Devices equipped with cameras, barcode readers, RFID readers, etc. may also be configured to process media keys. For example, a user may use a cellular phone to capture a barcode printed on a media key. The cellular phone may be configured to retrieve media data for the media key using the information encoded by the barcode. The retrieved media data may be output using the phone. In an alternative embodiment, the phone may communicate the machine readable information to another device or application that is configured to process the machine readable information. In one embodiment, the phone may be configured to generate pointers (e.g., URLs) to the storage locations of the media data corresponding to the media keys and communicate those pointers.

As another example, devices such as printers, copiers, facsimile machines, etc. may be configured to generate and/or process media keys. For example, a copier may provide an interface that allows a user to select media data for generating media keys. The copier may then generate one or more media keys for the media data. The copier may also be configured to read machine readable information from media keys and perform operations using the retrieved media data. For example, a copier may make a copy of a media key. The copier may read the machine readable information of the media key to be copied, retrieve media data for the media key, and then generate a new (copy) media key using the media data. The copier may create a media key upon scanning a document where the media key represents the scanned document.

In the case of a printer, the printer may be configured to read one or more media keys, retrieve media data corresponding to the media keys, and then generate printouts of the retrieved media data. For example, a printer may print photos corresponding to digital photos data retrieved for media keys. The printer may also be configured to generate printouts for other types of media data. For example, for audio data, a printer may be configured to generate print out a transcription of the audio information. For video information, the printer may be configured to print out selected key frames from the video information. If the media data comprises a combination of different types of media data, then the printout that is generated may comprise a printed representation of each type of information and the representations may be printed in a time synchronized manner. An example of a technique for printing media data on a paper medium is described in U.S. application Ser. No. 10/001,895 filed Nov. 19, 2001 assigned to the same assigned as the present application and titled "Paper-Based Interface For Multimedia Information", the entire contents of which are incorporated herein by reference for all purposes.

A kiosk may also be provided that is configured to generate and/or process media keys. Such a kiosk may accept memory media storing media data and then generate one or more media keys for user-selected media data. The kiosk may also be able to access networked storage and generate media keys for media data stored by the networked storage. The kiosk may also be capable of generating a media key using other media keys. For example, a user may place a collection of media keys on a glass platen of the kiosk and the kiosk may generate a media key for the collection of media keys.

A kiosk may also be configured to read and process media keys. For example, for a collection of media keys placed on a glass platen of the kiosk, the kiosk may be configured to retrieve media data for the media keys in the collection and perform operations on the retrieved media data. For example, if the retrieved media data comprises a set of slides and some music, then the kiosk may present a slideshow accompanied by music. The kiosk may be configured to perform various other operations using the retrieved media data. In some embodiments, a fee may be charged for using the kiosk.

Figure 16:
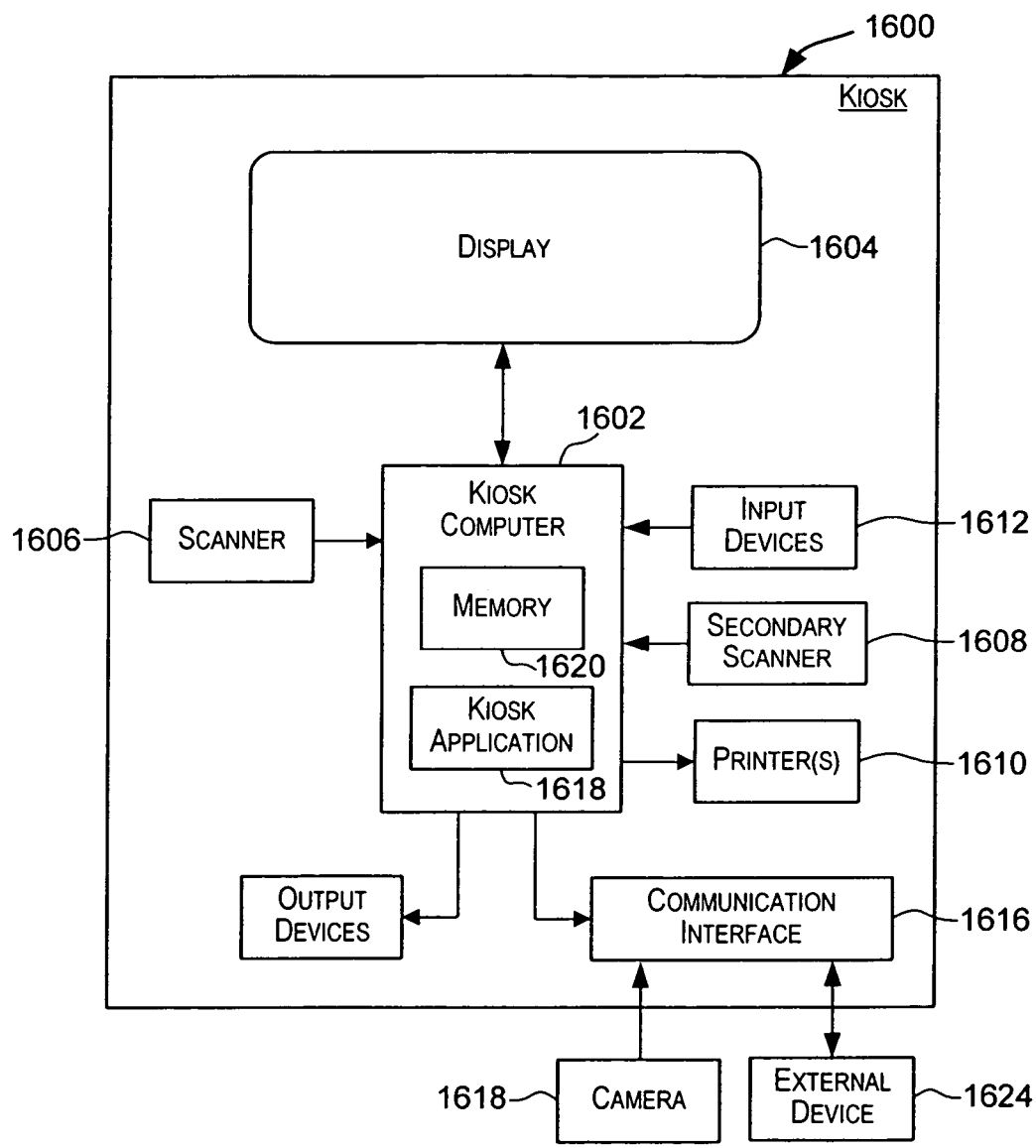
FIG. 16 depicts a simplified block diagram of a kiosk according to an embodiment of the present invention.

FIG. 16 depicts a simplified block diagram of a kiosk 1600 according to an embodiment of the present invention. As depicted in FIG. 16, kiosk 1600 comprises a kiosk computer or processing engine 1602, a display 1604, a scanner 1606, a secondary scanner 1608, a printer 1610, input devices 1612, output devices 1614, a communication interface 1616, and a camera 1618. Kiosk 1600 depicted in FIG. 16 is merely illustrative of an embodiment of the present invention. Kiosk 1600 may be placed on wheels to facilitate transportation.

Computer 1602 provides the processing engine for kiosk 1600. Computer 1602 may execute a kiosk application 1618 that enables a user to interact with and control the functioning of kiosk 1600. For example, a user may use kiosk application 1618 to identify media data for creating media keys. Media data corresponding to a media key may also be accessed using kiosk application 1618. Computer 1602 may comprise a memory 1620 for storing data. In one embodiment, a DELL® Optiplex GX620 with a dual Pentium 4 processor running at 3.8 GHz, a 256 Mb ATI Radeon X600 graphics card, and running Windows XP Pro operating system was used as computer 1602. In one embodiment, kiosk application 1618 is a Java program. Computer 1602 may provide various communication ports such as a FireWire port, USB ports, and other communication ports. These ports may be used for communicating to and from kiosk 1600.

Display 1604 is configured to output information from kiosk 1600 and may comprise a monitor, screen, etc. In one embodiment, display 1604 may be a touch-screen and may thus be also used as an input device. For example, a LCD panel such as a Planar PT191mu 19 inch LCD panel having a native resolution of 1280×1024 pixels may be used. The monitor has a capacitive touch panel surface which may be connected to computer 1602 using a USB cable.

Input devices 1612 may be used to input information to kiosk 1600. Input devices may comprise a keyboard, a mouse, a pointer, etc.

Scanner 1606 is an image capture device that comprises a platen and a digital camera. Scanner 1606 may be a linear array scanner such as a Canon LiDE scanner. Scanner 1606 is configured to read one or more media keys placed on the platen of the scanner. In one embodiment, scanner 1606 is configured to read or capture an image of machine readable information from the media keys. The media keys may be read in a specific order such as left to right and top to bottom. Alternatively, an image of all the media keys may be taken and the machine readable information for each media key determined from the image. The digital camera included in scanner 1606 may be a Canon Powershot G2 camera or some other camera or device for capturing digital images. The camera may be pointed to the transparent acrylic or glass platen of scanner 1606 and configured to capture an image of the media key placed on the platen. The captured information may be communicated to computer 1602 for further processing.

Kiosk 1600 may also comprise a secondary scanner 1608 for reading media keys. In one embodiment, the Logitech brand "QuickCam for Notebooks Deluxe" USB video camera is used as secondary scanner 1608. The native resolution of this camera is 640×480. In one embodiment, a 320×240 image resolution is used to read barcodes from media keys. Information captured by secondary scanner 1608 is communicated to computer 1602 via a communication link such as a USB cable. In one embodiment, the video camera may be kept on and when a QR code is seen in the captured image, the QR code is reported to kiosk application 1618 executed by computer 1602.

Kiosk 1600 may comprise one or more printers 1610. In one embodiment, a Hewlett-Packard Photosmart 8250 printer is used. The printer may be connected to computer 1602 via a USB cable. The HP printer is capable of printing high-quality color prints (e.g., 4×6 prints) and letter-size pages. In some embodiments, kiosk 1600 may comprise multiple printers to print different types of media keys. For example, a second printer such as a Datacard brand SP60 printer may be provided that is capable of printing 24 or 30 mil thick credit-card size cards. The SP60 can print full color on one side and black on the reverse side. It also puts a protective layer on the card after it is done printing. For example, the printer may be used to print on pre-scored key fob cards which can be broken into 3 separate cards after printing. The SP60 is a network printer and might be connected to computer 1602 via a Ethernet hub.

In some embodiments, kiosk 1600 may also be coupled to one or more external printers that are used to print media keys. Kiosk 1600 may communicate with an external printer using communication interface 1616.

Output devices 1614 may be used to output media data corresponding to the media keys. For example, output devices 1614 may comprise speakers for outputting audio information and the like. Various types of output devices may be provided.

Communication interface 1616 enables communication to and from kiosk 1600. Communication may be performed in different forms. For example, communication interface 1616 may provide a WiFi access point (e.g., a 802.11g WiFi access point), various communication ports such as USB ports, etc. Communication interface 1616 may facilitate communication of information with an external device 1624. External device 1624 may be a printer, a camera, an output device, a PDA, a telephone, another kiosk, and the like.

A camera 1618 may be provided with kiosk 1600 for capturing pictures. Kiosk 1600 may then print media keys for the captured images. For example, a Nikon P3 wireless camera may be provided. The wireless camera may connect to kiosk 1600 via communication interface 1616, for example, via a WiFi access point.

Media keys may also be used in commercial operations. For example, media keys may be generated for media data and sold to consumers who may then use the keys to access the media data corresponding to the media keys. For example, a music company may generate media keys for songs (or albums) and sell them to consumers instead of CDs or DVDs. A consumer may then use a media key to access a song (or album of songs) corresponding to the media key. In one embodiment, using a media key may cause the corresponding song (or album) to be automatically downloaded from a storage location to the consumer's music player (e.g., a MP3 player, Apple iPod) in a format desired by the consumer.

The examples (e.g., DVR, copier, phone, kiosk, MP3 player) described above merely illustrate embodiments of the present invention. Other devices and applications may also be configured to generate media keys and process media keys.

Example Applications

This section describes some examples of applications of media keys. The applications described here are not intended to limit the scope of the present invention as recited in the claims.

(1) Making a Collection or Album of Photos

A user may select a set of photos and request generation of a media key for the selected set. In one embodiment, the user may specifically identify the photos. In another embodiment, if media keys have previously been generated for the individual photos, then a new media key may be generated based upon the previously generated media keys. The media data corresponding to the new media key that is generated thus comprises the set of photos. In one embodiment, the data identifier for the new media key points to a list comprising data identifiers of the previously generated media keys and associated decryption keys. Each data identifier in the list may be used to locate corresponding media data which may be a photo. If the photo is encrypted, the decryption key associated with the data identifier in the list may be used to decrypt the media data. In this manner, the data identifier for the new key is used to find a collection of photos. The media key that is created thus represents a collection or album of photos and may then be used to output the set of photos. The photos may be output according to some order that has been determined.

(2) Slideshow Accompanied with Music

A user may select a set of slides and an audio clip and request generation of a media key for the selections. The selections may be made by specifically identifying the slides and audio clip and/or using previously generated media keys. The media data corresponding to the new media key thus includes both the slides and the audio clip. The new media key may then be used to output the slides and audio. In one embodiment, the slides may be output while the audio is simultaneously played, thereby creating a slideshow accompanied with music. The new media key thus represents a slideshow with music.

(3) Making a Movie from Several Video Clips

A user may select a set of video clips and request generation of a media key for the selections. The selections may be made by specifically identifying the video clips and/or using previously generated media keys for the individual video clips. The media data corresponding to the new media key thus includes the collection of video clips. A particular order may be imposed on the sequence of the video clips. The user may also specify the ordering. The media key may then be used to output the collection of video clips in a particular order thereby forming a movie. The media key thus represents a movie.

Camera

Instant cameras such as Polaroids are popular because they allow a photographer to immediately share a physical photo with others, including with those without cameras. With the popularity of digital cameras, photographers would also like to be able to share digital photographs immediately with others. A media key provides a token that enables the photographer to share a digital photo to another. A photographer may provide a media key corresponding to a photo or photos to another person who may subsequently use the media key to access the photo(s).

Figure 12:
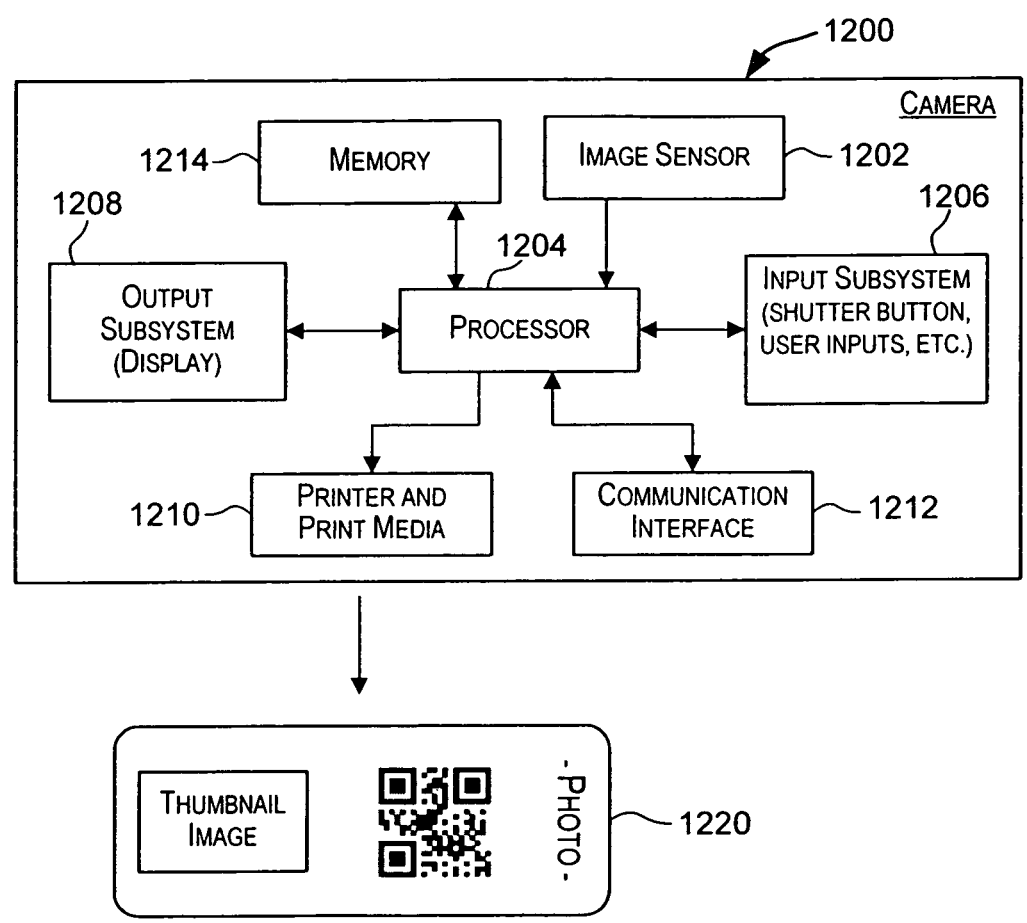
FIG. 12 is a simplified block diagram of a portable digital camera that may be configured to generate media keys according to an embodiment of the present invention.

FIG. 12 is a simplified block diagram of a portable digital camera 1200 that may be configured to generate media keys according to an embodiment of the present invention. Camera 1200 depicted in FIG. 12 is merely illustrative of an embodiment incorporating the present invention and is not intended to limit the scope of the invention as recited in the claims. One of ordinary skill in the art would recognize other variations, modifications, and alternatives.

As depicted in FIG. 12, camera 1200 comprises a processor 1202 coupled to an image sensor 1204, an input subsystem 1206, an output subsystem 1208, a printer and associated print media 1210, a communication interface 1212, and a memory 1214. Processor 1202 is configured to perform processing for camera 1200. Memory 1214 provides a repository for storing information used for processing performed by camera 1200.

Image sensor 1204 may be configured to sense and capture a digital image. Input subsystem 1206 may be used to interact with and provide inputs to camera 1200. For example, input subsystem 1206 may include a shutter release button which when pressed causes the camera to capture a picture. Input subsystem 1206 may also include other buttons, menus, etc. that may be selected to provide input to the camera. Camera 1200 may output information via output subsystem 1208. In one embodiment, output subsystem 1208 may comprise a display that can display information. For example, display 1208 may be a LCD screen.

According to an embodiment of the present invention, camera 1200 comprises a printer 1210 and associated print media. The print media may be paper, plastic, film, etc. Printer 1210 is configured to generate a media key for one or more photos using the medium, where the media key comprises machine readable information and possibly a thumbnail representative of the photo(s) for which the media key is generated. In one embodiment, printer 1210 may be a small compact low-power black and white (or color) printer enabling it to be used in a digital camera. Examples of compact printers that may be incorporated into a camera include printers provided by Advanced Printing Systems (APS) of Milan, Italy (www.aps-printers.com) such as the MP105 printer (http://www.aps-printers.com/m_aps/prodotti/MPseries.pdf). A digital camera with a printer is also described in U.S. Pat. No. 6,831,682 (assigned to Silverbrook Research PTY LTD., Australia), the entire contents of which are herein incorporated by reference for all purposes. The printer may run on battery power. The printer media (film, paper, etc.) may be stored in the camera along with the printer. An example of a digital printing camera is the Olympus and Polaroid Digital Printing Camera (Olympus C-211 Zoom) that is capable of printing directly on Polaroid film. These printers and printing cameras may be configured to generate media keys according to the teachings of the present invention.

In one embodiment, printer 1210 may be configured to write the machine readable information to a tag attached to a media key. For example, RFID tags may be attached to the medium included in the camera. Printer 1210 may create a media key using a medium having an attached RFID tag and may write the machine readable information to the memory of the RFID tag attached to the media key. Accordingly, printer 1210 may associate machine readable information with a media key by printing the machine readable information on a medium or by storing the machine readable information in a tag attached to the medium.

In one embodiment, after taking a picture, camera 1200 assigns a unique data identifier to the captured image. Camera 1200 may use various techniques described above to determine a data identifier for the captured image. In one embodiment, the data identifier may be determined based upon the captured image. In alternative embodiments, other information may be used to determine the data identifier for the captured image. An electronic or physical media key may then be created by camera 1200. The media key may comprise machine readable information comprising the data identifier assigned to the captured image. In embodiments where the captured image is stored in encrypted form, camera 1200 may also determine a decryption key for decrypting the encrypted information. The decryption key may be included in the machine readable information associated with the media key.

Camera 1200 may also generate a thumbnail image representative of the contents of the captured image. In one embodiment, the thumbnail image may be a miniature version of the captured image. The thumbnail image may be printed on the media key that is generated for the captured image. Printer 1210 may generate a physical media key 1220 by printing the media key on print media using printer 1210. Multiple media keys may be printed for a single image.

Camera 1200 may also be configured to generate a single media key (either electronic or physical) for multiple images captured using camera 1200. For example, multiple images may be chosen to become part of a collection of images, like a photo album. Camera 1200 may generate a single data identifier for the collection and also generate a thumbnail for the collection that is representative of the photos in the collection. In one embodiment, the single data identifier generated for the collection may reference a list of data identifiers for the individual photographs in the collection and decryption keys, if any, associated with the data identifiers. The list may be encrypted and the decryption key that enables decryption of the encrypted list may be included in the machine readable information associated with the media key generated for the collection. An electronic and/or physical media key may be created that comprises machine readable information encoding the data identifier for the collection and also possibly the decryption key for the collection. A thumbnail image representative of the contents of the collection may also be printed on the media key. Printer 1210 may generate a physical media key 1220 using the print media.

Communication interface 1212 facilitates communication of information to and from camera 1200. Communication interface 1212 may facilitate either wired or wireless (e.g., WiFi, iR) communication of information. For example, photos from camera 1200 may be uploaded to a storage location using communication interface 1212 when the camera is connected to a network. In one embodiment, the camera may connect to a service that provides storage for the images. The service may store the photos such that the photos can be accessed using their corresponding data identifiers. The service may also provide an interface (e.g., a web interface) for browsing through the stored media using data identifiers.

Communication interface 1212 may also provide an interface to external devices and systems. For example, communication interface 1212 may provide an interface for communicating data to an external printer. For example, machine readable information comprising the data identifier and optionally a decryption key may be communicated to an external printer that generates a physical media key and associates the machine readable information with the media key. Communication interface 1212 may also be used to transmit electronic media keys from the camera to another device.

Digital camera 1200 may be incorporated into other devices such as a mobile phone, PDA, etc. These devices may then generate media keys using the digital camera.

Figure 13:
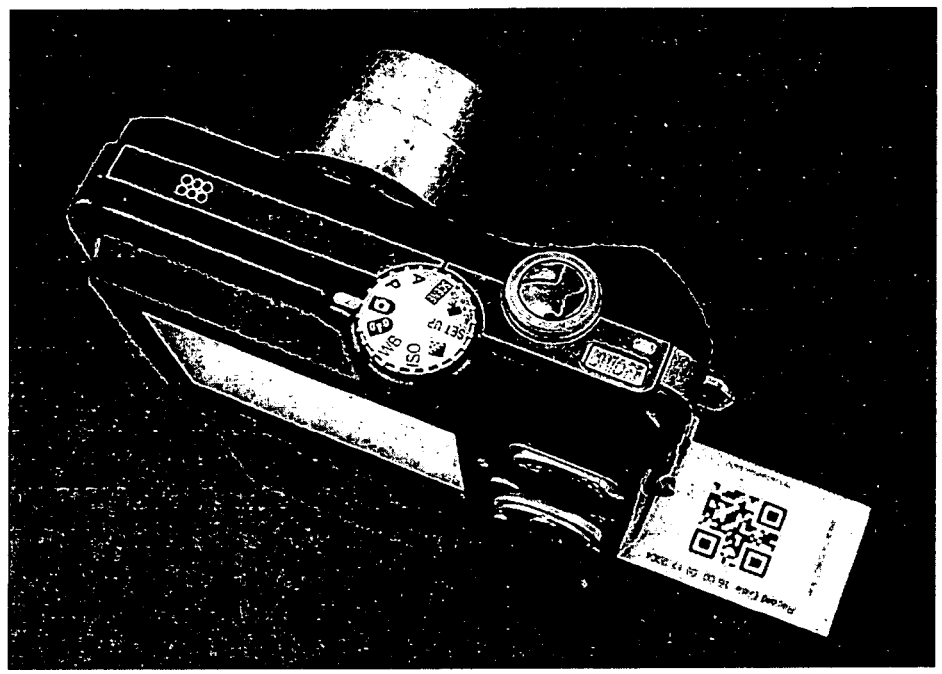
FIG. 13 depicts a portable digital camera configured to generate a media key according to an embodiment of the present invention.

FIG. 13 depicts another portable digital camera configured to generate a media key according to an embodiment of the present invention. The portability of the camera enables a user to carry and move the camera easily free from any encumbering external connections. The compact size and light weight of the camera also enhance its portability.

Figure 14:
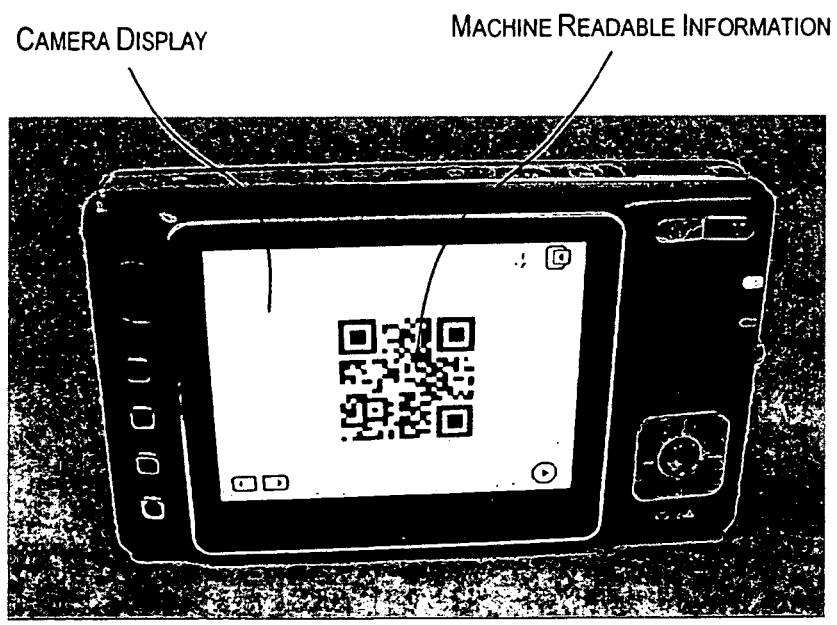
FIG. 14 depicts a camera displaying machine readable information in its display according to an embodiment of the present invention.

There are several ways to share media keys using a digital camera. In one embodiment, after taking a photograph, the camera may be configured to determine a data identifier and optionally a decryption key for the captured image. The camera may then display the data identifier and the associated decryption key, if any. In one embodiment, the camera may generate machine readable information comprising the data identifier and the decryption key determined for the captured image. The camera may then display the machine readable information using a display of the camera as depicted in FIG. 14.

A second camera may then be used to capture an image of the machine readable information displayed on the display of the first camera. In this manner, the second camera captures the machine readable information displayed by the first camera and which encodes the data identifier and optionally the decryption key for the image captured by the first camera. The second camera may then extract the data identifier and the decryption key from the image captured by the second camera and store the extracted information for later use.

The image captured by the first camera may be then be uploaded to a storage location. For example, the image may be uploaded when the first camera is connected to a network. A user of the second camera can then access the uploaded image using the data identifier extracted from the machine readable information image captured by the second camera. For example, the second camera may be connected to a computer which may then access the uploaded image using the extracted data identifier. If the image is encrypted, then the decryption key extracted from the machine readable information image may be used to decrypt the image. The second camera could be any device such as a handheld digital camera, a camera connected to a computer or other device, or some other device capable of capturing an image. In this manner, by displaying the machine-readable information, the first camera enables sharing of the image with other devices.

As described above, the camera determines and assigns a data identifier for a captured photo that enables the photo to be shared with others. Different techniques may be used to associate a data identifier (with optional decryption key) with an image (or encrypted image) so that when the camera is connected to a network or storage server, the image data or encrypted image data is uploaded to the correct location based on the data identifier. In one embodiment, the camera stores the data identifier in a table in the memory of the camera where it is associated with the captured image. In alternative embodiments, the data identifier (and decryption key) may be stored in a section of an image file such as in the IPTC (International Press Telecommunications Council) metadata or EXIF part of the image file. IPTC specifies a particular way to add captions and other metadata to images for photographers who send images to newspapers, etc. When the image is to be uploaded to a storage location from the camera, the data identifier associated with the image is read and the image is uploaded to the correct location corresponding to the data identifier so that other people and devices can access the image at a later time using the data identifier.

Another technique for sharing photos is by using media keys. A printer may be incorporated in the camera or may be connected to the camera via communication interface 1012 and may be used to create media keys. After a picture is taken, the camera may choose a data identifier and an optional decryption key for the picture. A media key (either electronic of physical) may then be created and the machine readable information comprising the data identifier and the decryption key associated with the media key. The media key, like a receipt, may be given to someone who is interested in seeing the photo at a later time. The camera may then upload the captured picture to a storage location such that the data identifier chosen for the picture can be used to access the picture from the storage location. For purposes of security the uploaded photo may be encrypted. The media key may then be used to access the uploaded image. This method of sharing does not require the any electronic hardware to receive the media key. The recipient does not need a camera or a PDA or any other electronic equipment. The recipient of the media key can carry the media key to their home computer or a public kiosk with a key reader to access the photo from the storage location, as previously described. If the photo is encrypted, then the decryption key read from the media key may be used to decrypt the photo. Operations may then be performed on the photo, e.g., the photo may be printed.

In some embodiments, the data identifier for a photo or collection and an optional decryption key may be generated in advance of taking the photo. Accordingly, a list of predetermined data identifiers and possibly decryption keys may be provided. This allows the data identifiers and the decryption keys to be shared with other people before the photos are captured. In this embodiment, a data identifier may be chosen in a way that guarantees it to be unique. After a photo has been captured, a data identifier from the predetermined data identifiers may be assigned to the photo. If the photo is to be encrypted, then a decryption key from the preconfigured decryption keys may be associated with the photo. A media key may then be generated for the photos comprising the data identifier and the decryption key assigned to the photo.

A data identifier from the predetermined list of data identifiers may also be assigned to a collection of photos. The data identifier assigned to the collection may point to a list of data identifiers assigned to photos in the collection. The list of data identifiers referenced by the assigned data identifier may be encrypted and a decryption key may be associated with the data identifier assigned to the collection that enables decryption of the encrypted list.

After a collection of photos has been identified, the collection may be uploaded to a storage location. A service may be used for facilitating the upload process. The service may provide storage services for the collection in such a way that the collection can be accessed using the data identifier for the collection. Users who have received the data identifier and decryption key for the collection (or a media key for the collection) may then access the collection from the stored location. The data identifier assigned to the collection is used to determine the storage location for the collection. If encrypted, the decryption key for the collection may be used to decrypt the collection. In one embodiment, a user may connect to a service that stored the collection. The service may provide a user interface (e.g., a web page) where the user can enter the data identifier and access the corresponding media data.

In some embodiments, the media key that is created for media data need not even be given to the person with whom the media data is to be shared. For example, a media key may be created for some media data. The media key may have machine readable information associated with that comprises a data identifier and optionally a decryption key and additional information. The person with whom the media data is to be shared may then capture the machine readable information from the media key. For example, the person may use a camera to capture an image of the machine readable information printed on the media key. In other embodiments, the person may use a device that can read machine readable information from an RFID tag associated with media key and storing the machine readable information. The image of the machine readable information captured by the person may then be analyzed to determine a data identifier that may then be used to access the corresponding media data. When person connects the person's camera to a data processing system (e.g., a PC) or to a network such as the Internet, the machine readable information image captured by the camera may be communicated from the camera to the PC. The information may be communicated in the form of a request requesting the PC to analyze and access media data corresponding to the machine readable information. The PC may then perform processing to analyze the machine readable information image to determine a data identifier (and optionally a decryption key or additional information) from the machine readable information. The data identifier may then be used to access the media data corresponding to the media key. In some embodiments, the analysis of the image to determine a data identifier may be performed by the camera and the data identifier may then be communicated to the PC for accessing the media data pointed to by the data identifier. Accordingly, as described above, the person with whom media data is to be shared with need not possess the media key in order to access media data corresponding to the media key, the corresponding media data may be accessed by capturing the machine readable information associated with the media key.

A camera, as described above, may be used in various different scenarios. For example, consider a scenario where a group gathers for a digital photo. One person in the group may have a digital camera as described above. After taking several pictures, the photographer may review the captured images using a LCD screen of the digital camera and find the best photo. The photographer may then use the digital camera to print out a media key for others in the group. The media key may comprise a machine readable information (e.g., a QR Code) comprising a unique data identifier determined by the camera for the selected image. When the photographer returns home and connects his/her camera to his/her personal computer (PC), the selected image is uploaded to a location accessible using the data identifier. A member of the group who has received a media key may use a device (e.g., a USB webcam) to read the machine readable information from the media key and determine the data identifier from the machine readable information. The data identifier may then be used to automatically access the stored image which may then be displayed to the member on his/her PC.

As another example, consider another scenario where a friend of the bride and groom has agreed to take pictures during the reception. At the end of the evening the friend adds all of the best photos to an album, prints a media key for the album, and presents it to the bride and groom. Upon arriving home, the photographer inserts the memory card storing the album into a PC and the images are encrypted and uploaded to a server. The next day, on an island in the middle of the Pacific, the newlyweds enjoy browsing through the album online using the media key given to them by their photographer friend. The media key comprises a data identifier that enables access to the album and also comprises a decryption key that enables decryption of the encrypted album.

An embodiment of a camera has been described above for generating data identifiers and optionally decryption keys for images captured using the camera. Further, techniques are described that allow the camera to share the captured images with others. In alternative embodiments, the processing described above may also be applied to other media types such as audio data, video data, image data, etc. and combinations thereof. The functionality of the camera may be embodied in other types of devices.

Communication of Media Keys

As described above, media keys may be generated as physical objects or as digital objects. In the electronic form, a media key may be communicated or transmitted by a variety of methods. An electronic media key may be transmitted via a network, either wired or wireless or a combination thereof. For example, media keys may be transmitted via radio networking systems such as IEEE 802.11 WI-fi networks, or IEEE 802.15 Bluetooth networks, etc. Wired or contact based networks, such as USB or skin transmitting networks may also be used to transmit media keys. Various applications may be provided based upon the transmission of media keys.

Transmission of media keys rather than the media data corresponding to the media keys reduces the amount of data that needs to be transmitted as the size of an electronic media key is quite small compared to the size of the media data corresponding to the media key. As a result, media keys can be securely transmitted over low speed networks in a short time. Further, the media keys may be exchanged between devices without revealing the media data corresponding to the media keys.

Figure 15:
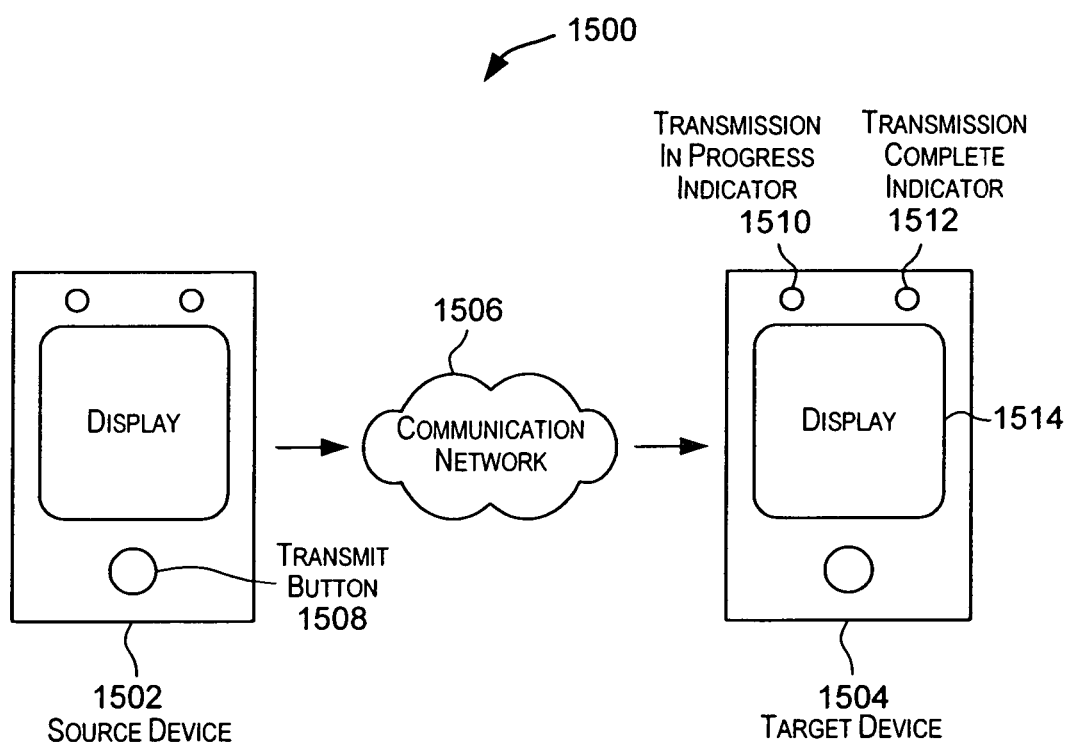
FIG. 15 depicts a simplified system for transmission of digital media keys according to an embodiment of the present invention.

Unlike exchange of physical media keys, transmission networks generally do not provide the same tangible evidence of transmission of a digital or electronic media key. As a result, it is desirable to provide some sort of user feedback to demonstrate successful transmission of an electronic media key. FIG. 15 depicts a simplified system 1500 for transmission of digital media keys according to an embodiment of the present invention. As depicted in FIG. 15, media keys may be transmitted from a source device 1502 to a target device 1504. A mechanism may be provided on the source device for initiating transmission of a media key. For example, as depicted in FIG. 15, source device 1502 may comprise a transmit button 1508 for initiating transmission of one or more media keys. A user may press button 1508 to initiate transmission of selected one or more media keys to a target device. The one or more electronic media keys are then transmitted to target device 1504 via communication network 1506.

Communication network 1506 may be a wired or wireless communication network or combinations thereof. Different communication protocols may be used to transmit the media keys.

Target device 1504 may comprise indicators for indicating that transfer of a media key is in progress and also to indicate successful completion of the transmission. As depicted in FIG. 15, target device 1504 comprises an LED lamp 1510 which is lighted when transmission is in progress. Target device 1504 may also comprise a second lamp 1512 which is lighted when transmission of the media key has successfully completed. In alternative embodiments, other mechanisms such as other visual indicators, auditory tones or clicks, haptic indicators, and other indicators might also be used. Target device 1504 may also indicate successful transmission by simply immediately displaying the transmitted electronic media key(s) or media data corresponding to the transmitted media keys on a display 1514 of target device 1504.

Various actions may be performed by the target device upon receiving electronic media keys. The target device may determine a data identifier from the media key and use the data identifier to access media data corresponding to the media key. The target device may also determine a decryption key from the electronic media key. If the media data accessed for a media key is determined to be encrypted, the target device may use the decryption key to decrypt the media data. Various actions may be performed using the media data accessed for the media key.

In one embodiment, the media data corresponding to the media key may be automatically output by target device 1504. Several applications may also be enabled upon successful electronic transmission of a media key. The response and action taken upon transmission of a media key may depend upon the media key that is transmitted and also the target device which receives the media key. For example, if the target device is a printer device or Multi-Function Printer (MFP), then the media key may be printed to generate a physical media key. In alternative embodiments, the media data corresponding to the electronic media key may be accessed and printed by the printer device. Different techniques may be used for printing the media data. An example of a technique for printing media data on a paper medium is described in U.S. application Ser. No. 10/001,895 filed Nov. 19, 2001 assigned to the same assigned as the present application and titled "Paper-Based Interface For Multimedia Information", the entire contents of which are incorporated herein by reference for all purposes.

As another example, if the target device is a digital projector then the media data corresponding to the transmitted media key may be automatically displayed on the projector. A media key transmitted to a computer monitor or digital display (e.g., a television, wall-mounted screen) might cause display of the media data corresponding to the transmitted media key on the display, or alternatively, a window may be opened displaying the media data corresponding to the media key. A digital bulletin board might add the media data corresponding to the transmitted media key to a list of media to be sequentially displayed. Transmission of a media key to a PDA or cell phone may cause the target device to store the media key and the media data corresponding to the media key (e.g., a document corresponding to the media key may be fetched and stored on the phone). Transmission of a media key to a storage device (e.g., a disk drive), such as a network attached storage system or document management system, may cause the system to store the media key and possibly the media data corresponding to the media key. The storage device may be incorporated in a device such as a PDA, smart phone, portable phone, etc.

In one embodiment, a kind of device, a digital inbox, may be provided that allows transmission of media keys to a secondary device. Such a transmission might take place immediately upon receiving a media key, or the device may store the media key for later transmission. The receiving device may then communicate or forward the media key and/or the media data corresponding to the media key to another device when one or more conditions are met. For example, in one embodiment, the media key may be transmitted to another device according to a schedule, or upon the opportunistic availability of another device, or upon occurrence of certain events, etc. For example, a digital inbox may send any transmitted media key to a second device (e.g., a digital inbox of one person may send the media key to a second person's computer). Alternatively, a digital inbox may cause any transmitted media key or the media data corresponding to the media key to be transmitted to a printer in another possibly remote location, such as an overseas central office. The printer may be configured to print the media key or print the media data corresponding to the media key.

In one embodiment, a telephone handset may serve as a digital inbox, allowing documents to be transmitted to the telephone of the person on the other end of the phone conversation by simply transferring one or more media keys corresponding to the documents. A conference room table could serve as a digital inbox, routing media keys corresponding to documents to be discussed at a meeting to all laptop computers which are currently sitting on the table or are within certain proximity of the table, or to a nearby digital projector. The media keys may then be used to access the documents. A digital inbox at a person's office might transmit stored media keys to the person's laptop whenever the person returns to the office. In one embodiment, in a secure environment, a digital inbox might transmit media keys to any device only if the target device can satisfy certain authentication requirements or tests, such as possession of a digital access key. The transmission may be terminated (or not initiated) if the authentication requirements are not satisfied. A digital inbox might include a display of its own, or it might use much simpler visual and auditory feedback as described above.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of transmitting an electronic media key, the method comprising:
   indicating, on a first device, initiation of transmission of an electronic media key to the first device from a second device, the electronic media key comprising a data identifier and a decryption key, wherein the data identifier is used to locate and access encrypted media data associated with the electronic media key, the decryption key usable for decrypting the encrypted media data, wherein the data identifier points to a location where the encrypted media data is stored, and wherein the location is remote from the electronic media key and the first device;
   receiving, by the first device, the electronic media key from the second device; and
   upon the first device receiving the electronic media key from the second device, printing a physical media key including machine readable information, the machine readable information including the data identifier and the decryption key included in the electronic media key.

2. The method of claim 1 further comprising printing the decrypted media data corresponding to the data identifier.

3. The method of claim 1 further comprising displaying the decrypted media data corresponding to the data identifier on a digital display.

4. The method of claim 1 further comprising:
   communicating the electronic media key from the first device to a third device.

5. The method of claim 4 wherein the communicating comprises communicating the electronic media key to the third device when a set of one or more conditions is met.

6. The method of claim 1 further comprising:
   upon the first device receiving the electronic media key from the second device:
      accessing the encrypted media data using the data identifier included in the electronic media key;
      decrypting the accessed encrypted media data using the decryption key included in the electronic media key to produce decrypted media data; and
      outputting the decrypted media data.

7. The method of claim 1 further comprising:
   indicating on the first device, separate from indicating the initiation of transmission of the electronic media key from the second device, completion of the transmission of the electronic media key from the second device to the first device.

8. A device comprising:
   an indicator component configured to indicate initiation of transmission of an electronic media key to the device from a second device, the electronic media key comprising a data identifier and a decryption key, the data identifier is used to locate and access encrypted media data associated with the electronic media key, the decryption key usable for decrypting the encrypted media data, wherein the data identifier points to a location where the encrypted media data is stored, and wherein the location is remote from the electronic media key and the first device; and a printer component configured to, upon receiving, by the device, the electronic media key from the second device, print a physical media key including machine readable information, the machine readable information including the data identifier and the decryption key included in the electronic media key.

9. The device of claim 8 further configured to print the decrypted media data accessed using the data identifier included in the electronic media key.

10. The device of claim 8 further comprising a display configured to display the decrypted media data accessed using the data identifier.

11. The device of claim 8 further comprising:
a module configured to communicate the electronic media key from the device to a third device.

12. The device of claim 11
wherein the module is configured to communicate the electronic media key to the third device when a set of one or more conditions is met.

13. The device of claim 8 wherein the first indicator component includes a light emitting diode.

14. The device of claim 8 further configured to:
access the encrypted media data using the data identifier included in the electronic media key;
decrypt the accessed encrypted media data using the decryption key included in the electronic media key to produce decrypted media data; and
output the decrypted media data.

15. The device of claim 8 further comprising:
a second indicator component indicating completion of the transmission of the electronic media key from the second device to the device.

16. A method comprising:
indicating, using a first indicator on a first device, initiation of transmission of an electronic media key to the first device from a second device, the electronic media key comprising a data identifier and a decryption key, the data identifier used to locate and access encrypted media data associated with the electronic media key, the decryption key usable for decrypting the encrypted media data, wherein the data identifier points to a location where the encrypted media data is stored, and wherein the location is remote from the electronic media key and the first device;
upon the first device receiving the electronic media key from the second device:
accessing, by the first device, the remotely stored encrypted media data using the data identifier included in the electronic media key;
decrypting, by the first device, the accessed encrypted media data using the decryption key included in the electronic media key to produce decrypted media data; and
outputting, by the first device, the decrypted media data.

17. The method of claim 16 further comprising:
indicating, using a second indicator provided on the first device separately from the first indicator, completion of the transmission of the electronic media key from the second device to the first device.

18. The method of claim 16 further comprising:
upon receiving the electronic media key by the first device from the second device, printing a physical media key comprising machine readable information, the machine readable information including the data identifier and the decryption key included in the electronic media key.

19. The method of claim 16 wherein:
the first device is a digital projector; and
the outputting comprises outputting the decrypted media data using the projector.

20. The method of claim 16 wherein the first device is a printer.

* * * * *